United States Patent
Li et al.

(10) Patent No.: US 10,506,254 B2
(45) Date of Patent: Dec. 10, 2019

(54) FEATURES OF BASE COLOR INDEX MAP MODE FOR VIDEO AND IMAGE CODING AND DECODING

(71) Applicants: Microsoft Technology Licensing, LLC, Redmond, WA (US); Bin Li, Beijing (CN); Feng Wu, Beijing (CN); Jizheng Xu, Beijing (CN)

(72) Inventors: Bin Li, Beijing (CN); Feng Wu, Beijing (CN); Jizheng Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 737 days.

(21) Appl. No.: 15/025,134

(22) PCT Filed: Oct. 14, 2013

(86) PCT No.: PCT/CN2013/085166
§ 371 (c)(1),
(2) Date: Mar. 25, 2016

(87) PCT Pub. No.: WO2015/054812
PCT Pub. Date: Apr. 23, 2015

(65) Prior Publication Data
US 2016/0277760 A1  Sep. 22, 2016

(51) Int. Cl.
*H04N 19/593* (2014.01)
*H04N 19/70* (2014.01)
(Continued)

(52) U.S. Cl.
CPC ......... *H04N 19/593* (2014.11); *H04N 19/126* (2014.11); *H04N 19/70* (2014.11);
(Continued)

(58) Field of Classification Search
CPC .... H04N 19/11; H04N 19/126; H04N 19/154; H04N 19/176; H04N 19/593; H04N 19/61; H04N 19/70
(Continued)

(56) References Cited

U.S. PATENT DOCUMENTS 5,049,986 A   9/1991 Aono et al.
5,488,570 A   1/1996 Agarwal
(Continued)

FOREIGN PATENT DOCUMENTS

CN   1874519       12/2006
CN   101009835     8/2007
(Continued)

OTHER PUBLICATIONS

Alshina et al., "AhG5: Intra block copy within one LCU," JCTVC-O0074, pp. 1-5 (Oct. 2013).
(Continued)

*Primary Examiner* — William C Vaughn, Jr.
*Assistant Examiner* — Naod W Belai
(74) *Attorney, Agent, or Firm* — Klarquist Sparkman, LLP

(57) ABSTRACT

Innovations in the use of base color index map ("BCIM") mode during encoding and/or decoding simplify implementation by reducing the number of modifications made to support BCIM mode and/or improve coding efficiency of BCIM mode. For example, some of the innovations involve reuse of a syntax structure that is adapted for transform coefficients to instead signal data for elements of an index map in BCIM mode. Other innovations relate to mapping of index values in BCIM mode or prediction of elements of an index map in BCIM mode. Still other innovations relate to handling of exception values in BCIM mode.

20 Claims, 20 Drawing Sheets

(51) Int. Cl.
*H04N 19/126* (2014.01)
*H04N 19/61* (2014.01)
*H04N 19/176* (2014.01)
*H04N 19/11* (2014.01)
*H04N 19/154* (2014.01)

(52) U.S. Cl.
CPC ............ *H04N 19/11* (2014.11); *H04N 19/154* (2014.11); *H04N 19/176* (2014.11); *H04N 19/61* (2014.11)

(58) Field of Classification Search
USPC .................................................. 375/240.12
See application file for complete search history.

(56) References Cited

U.S. PATENT DOCUMENTS

| | | |
|---|---|---|
| 5,706,290 A | 1/1998 | Shaw et al. |
| 6,292,194 B1 | 9/2001 | Powell, III |
| 6,400,893 B1 | 6/2002 | Murase et al. |
| 6,701,012 B1 | 3/2004 | Matthews |
| 6,748,116 B1 | 6/2004 | Yue |
| 7,016,547 B2 | 3/2006 | Smirnov |
| 7,023,924 B1 | 4/2006 | Keller et al. |
| 7,072,512 B2 | 7/2006 | Mehrotra |
| 7,085,420 B2 | 8/2006 | Mehrotra |
| 7,218,790 B2 | 5/2007 | Smirnov |
| 7,289,674 B2 | 10/2007 | Karczewicz |
| 7,317,839 B2 | 1/2008 | Holcomb |
| 7,340,103 B2 | 3/2008 | Smirnov |
| 7,352,905 B2 | 4/2008 | Mukerjee et al. |
| 7,403,136 B2 | 7/2008 | De La Cruz et al. |
| 7,496,143 B2 | 2/2009 | Schwarz et al. |
| 7,848,426 B2 | 12/2010 | Lee et al. |
| 7,903,873 B2 | 3/2011 | Lu et al. |
| 7,965,861 B2 | 6/2011 | Agaian et al. |
| 7,978,770 B2 | 7/2011 | Luo et al. |
| 8,036,271 B2 | 10/2011 | Winger et al. |
| 8,085,845 B2 | 12/2011 | Tourapis et al. |
| 8,116,374 B2 | 2/2012 | Gordon et al. |
| 8,170,101 B2 | 5/2012 | Lei |
| 8,213,503 B2 | 7/2012 | Tu et al. |
| 8,218,641 B2 | 7/2012 | Wang |
| 8,300,963 B2 | 10/2012 | Ohk et al. |
| 8,369,568 B2 | 2/2013 | Agaian et al. |
| 8,457,200 B2 | 6/2013 | Andersson et al. |
| 8,472,792 B2 | 6/2013 | Butt et al. |
| 8,493,513 B2 | 7/2013 | Sullivan |
| 8,509,553 B2 | 8/2013 | Ding |
| 8,619,857 B2 | 12/2013 | Zhao et al. |
| 8,644,375 B2 | 2/2014 | Segall et al. |
| 8,693,547 B2 | 4/2014 | Bankoski et al. |
| 8,711,945 B2 | 4/2014 | Henocq et al. |
| 8,731,369 B2 | 5/2014 | Li et al. |
| 8,737,824 B1 | 5/2014 | Bultje |
| 8,861,848 B2 | 10/2014 | Sato |
| 9,252,806 B2 | 2/2016 | Marpe et al. |
| 9,264,713 B2 | 2/2016 | Joshi et al. |
| 9,288,501 B2 | 3/2016 | Zheng et al. |
| 9,516,342 B2 | 12/2016 | Gisquet et al. |
| 9,591,325 B2 | 3/2017 | Li et al. |
| 9,609,336 B2 | 3/2017 | Topiwala et al. |
| 9,654,806 B2 | 5/2017 | Zou et al. |
| 9,699,468 B2 | 7/2017 | Guo et al. |
| 9,704,270 B1 | 7/2017 | Main et al. |
| 9,788,004 B2 | 10/2017 | Sun et al. |
| 9,924,175 B2 | 3/2018 | Pu et al. |
| 10,021,403 B2 | 7/2018 | Kolesnikov et al. |
| 10,038,915 B2 | 7/2018 | Joshi et al. |
| 10,062,181 B1 | 8/2018 | Longhurst et al. |
| 10,129,540 B2 | 11/2018 | Budagavi |
| 10,136,141 B2 | 11/2018 | Pu et al. |
| 10,230,983 B2 | 3/2019 | Liu et al. |
| 10,237,575 B2 | 3/2019 | Tsai et al. |
| 10,264,285 B2 | 4/2019 | Joshi et al. |
| 2001/0036314 A1 | 11/2001 | Yamaguchi et al. |
| 2001/0053248 A1 | 12/2001 | Maeda |
| 2002/0168105 A1 | 11/2002 | Li |
| 2003/0048944 A1 | 3/2003 | De Bonet |
| 2003/0202588 A1 | 10/2003 | Yu et al. |
| 2004/0022444 A1 | 2/2004 | Rhoads |
| 2004/0062312 A1 | 4/2004 | Heuer et al. |
| 2004/0202374 A1 | 10/2004 | Venkataraman |
| 2005/0185713 A1 | 8/2005 | Winger et al. |
| 2005/0249283 A1 | 11/2005 | Kajiwara et al. |
| 2006/0104527 A1 | 5/2006 | Koto et al. |
| 2006/0274956 A1 | 12/2006 | Sohn et al. |
| 2006/0282855 A1 | 12/2006 | Margulis |
| 2007/0036226 A1 | 2/2007 | Kim et al. |
| 2007/0116110 A1 | 5/2007 | Diamant et al. |
| 2007/0116370 A1 | 5/2007 | Smirnov |
| 2007/0201751 A1 | 8/2007 | Wu et al. |
| 2008/0021879 A1 | 1/2008 | Cheng |
| 2008/0037624 A1 | 2/2008 | Walker et al. |
| 2008/0063080 A1 | 3/2008 | Madumbu et al. |
| 2008/0084924 A1 | 4/2008 | Monro et al. |
| 2008/0317132 A1 | 12/2008 | Zhou et al. |
| 2009/0074307 A1 | 3/2009 | Lu et al. |
| 2009/0195690 A1 | 8/2009 | Wang |
| 2010/0061461 A1 | 3/2010 | Bankoski et al. |
| 2010/0111410 A1 | 5/2010 | Lu et al. |
| 2010/0158400 A1 | 6/2010 | Lu et al. |
| 2011/0142132 A1 | 6/2011 | Tourapis et al. |
| 2011/0194613 A1 | 8/2011 | Chen et al. |
| 2011/0255591 A1 | 10/2011 | Kim et al. |
| 2012/0163451 A1 | 6/2012 | Cohen et al. |
| 2012/0163457 A1 | 6/2012 | Wahadaniah et al. |
| 2012/0177118 A1 | 7/2012 | Karczewicz et al. |
| 2012/0189055 A1 | 7/2012 | Chien et al. |
| 2012/0195368 A1 | 8/2012 | Chien et al. |
| 2012/0236942 A1 | 9/2012 | Lin et al. |
| 2012/0250764 A1 | 10/2012 | Martin et al. |
| 2012/0281760 A1 | 11/2012 | Kim |
| 2012/0294353 A1 | 11/2012 | Fu et al. |
| 2012/0300840 A1 | 11/2012 | Ueda |
| 2012/0320975 A1 | 12/2012 | Kim et al. |
| 2012/0328209 A1 | 12/2012 | Sasai et al. |
| 2013/0003827 A1 | 1/2013 | Misra et al. |
| 2013/0034163 A1 | 2/2013 | Amonou et al. |
| 2013/0050254 A1 | 2/2013 | Tran et al. |
| 2013/0051452 A1 | 2/2013 | Li et al. |
| 2013/0114675 A1 | 5/2013 | Guo et al. |
| 2013/0114677 A1 | 5/2013 | Baylon et al. |
| 2013/0114713 A1 | 5/2013 | Bossen et al. |
| 2013/0114730 A1 | 5/2013 | Joshi et al. |
| 2013/0121417 A1 | 5/2013 | Chong et al. |
| 2013/0128974 A1 | 5/2013 | Chien et al. |
| 2013/0128982 A1 | 5/2013 | Kim et al. |
| 2013/0163664 A1 | 6/2013 | Guo et al. |
| 2013/0163668 A1 | 6/2013 | Chen et al. |
| 2013/0170550 A1 | 7/2013 | Li et al. |
| 2013/0182755 A1 | 7/2013 | Chen et al. |
| 2013/0188695 A1 | 7/2013 | Maani et al. |
| 2013/0188719 A1 | 7/2013 | Chen et al. |
| 2013/0202051 A1 | 8/2013 | Zhou |
| 2013/0215970 A1 | 8/2013 | Fang et al. |
| 2013/0243093 A1 | 9/2013 | Chen et al. |
| 2013/0258052 A1 | 10/2013 | Li et al. |
| 2013/0259128 A1 | 10/2013 | Song et al. |
| 2013/0272370 A1 | 10/2013 | Coban et al. |
| 2013/0272409 A1 | 10/2013 | Seregin et al. |
| 2013/0279577 A1 | 10/2013 | Schwarz et al. |
| 2013/0287103 A1 | 10/2013 | Seregin et al. |
| 2014/0002599 A1 | 1/2014 | Lee et al. |
| 2014/0003493 A1 | 1/2014 | Chen et al. |
| 2014/0003531 A1 | 1/2014 | Coban et al. |
| 2014/0016698 A1 | 1/2014 | Joshi et al. |
| 2014/0029668 A1 | 1/2014 | Lim et al. |
| 2014/0064360 A1 | 3/2014 | Rapaka et al. |
| 2014/0071235 A1 | 3/2014 | Zhang et al. |
| 2014/0086502 A1 | 3/2014 | Guo et al. |
| 2014/0140404 A1 | 5/2014 | Liu et al. |
| 2014/0184740 A1 | 7/2014 | Zhang et al. |
| 2014/0192883 A1 | 7/2014 | Seregin |

(56) References Cited

U.S. PATENT DOCUMENTS

| | | |
|---|---|---|
| 2014/0253681 A1 | 9/2014 | Zhang et al. |
| 2014/0294061 A1 | 10/2014 | Zhang et al. |
| 2014/0301465 A1 | 10/2014 | Kwon et al. |
| 2014/0301475 A1* | 10/2014 | Guo .................... H04N 19/50 375/240.24 |
| 2014/0355667 A1 | 12/2014 | Lei et al. |
| 2014/0376634 A1 | 12/2014 | Guo et al. |
| 2015/0016501 A1 | 1/2015 | Guo et al. |
| 2015/0016533 A1 | 1/2015 | Pang et al. |
| 2015/0030066 A1* | 1/2015 | Xu ..................... H04N 19/463 375/240.02 |
| 2015/0071357 A1 | 3/2015 | Pang et al. |
| 2015/0110181 A1 | 4/2015 | Saxena et al. |
| 2015/0146976 A1 | 5/2015 | Ma et al. |
| 2015/0186100 A1 | 7/2015 | Tsai et al. |
| 2015/0189319 A1* | 7/2015 | Pu ..................... H04N 19/176 375/240.03 |
| 2015/0195526 A1 | 7/2015 | Zhu et al. |
| 2015/0195559 A1 | 7/2015 | Chen et al. |
| 2015/0208084 A1 | 7/2015 | Zhu et al. |
| 2015/0229933 A1 | 8/2015 | Guo et al. |
| 2015/0262404 A1 | 9/2015 | Laude et al. |
| 2015/0264348 A1 | 9/2015 | Zou et al. |
| 2015/0270850 A1 | 9/2015 | Marpe et al. |
| 2015/0271517 A1 | 9/2015 | Pang et al. |
| 2015/0312573 A1 | 10/2015 | Bugdayci et al. |
| 2015/0326864 A1 | 11/2015 | Lainema |
| 2015/0341635 A1 | 11/2015 | Seregin et al. |
| 2015/0341655 A1 | 11/2015 | Joshi et al. |
| 2015/0341656 A1 | 11/2015 | Seregin et al. |
| 2015/0341674 A1 | 11/2015 | Seregin et al. |
| 2015/0381994 A1 | 12/2015 | Yu et al. |
| 2016/0057420 A1 | 2/2016 | Pang et al. |
| 2016/0057430 A1 | 2/2016 | Kolesnikov et al. |
| 2016/0112713 A1 | 4/2016 | Russell |
| 2016/0219298 A1 | 7/2016 | Li et al. |
| 2016/0227244 A1 | 8/2016 | Rosewarne |
| 2016/0241858 A1 | 8/2016 | Li et al. |
| 2016/0241868 A1 | 8/2016 | Li et al. |
| 2016/0277733 A1 | 9/2016 | Li et al. |
| 2016/0277760 A1 | 9/2016 | Li et al. |
| 2016/0309172 A1 | 10/2016 | Laroche et al. |
| 2016/0309177 A1 | 10/2016 | Laroche et al. |
| 2016/0316214 A1 | 10/2016 | Gisquet et al. |
| 2016/0330471 A1 | 11/2016 | Zhu et al. |
| 2016/0373788 A1 | 12/2016 | Gamei et al. |
| 2017/0064330 A1 | 3/2017 | Li et al. |
| 2017/0070748 A1 | 3/2017 | Li et al. |
| 2017/0127058 A1 | 5/2017 | Misra et al. |
| 2017/0127090 A1 | 5/2017 | Rosewarne et al. |
| 2017/0142418 A1 | 5/2017 | Li et al. |
| 2017/0155899 A1 | 6/2017 | Lin et al. |
| 2017/0180737 A1 | 6/2017 | Ye et al. |
| 2017/0238001 A1 | 8/2017 | Li et al. |
| 2017/0302939 A1 | 10/2017 | Guo et al. |
| 2018/0146197 A1 | 5/2018 | Yi et al. |
| 2018/0288415 A1 | 10/2018 | Li et al. |

FOREIGN PATENT DOCUMENTS

| | | |
|---|---|---|
| CN | 101026761 | 8/2007 |
| CN | 101232619 | 7/2008 |
| CN | 101420606 | 4/2009 |
| CN | 101626512 | 1/2010 |
| CN | 101816177 | 8/2010 |
| CN | 102077594 | 5/2011 |
| CN | 102137263 | 7/2011 |
| CN | 102223541 | 10/2011 |
| CN | 102752595 | 10/2012 |
| CN | 103155563 | 6/2013 |
| CN | 103220512 | 7/2013 |
| CN | 103237226 | 8/2013 |
| CN | 103238332 | 8/2013 |
| CN | 103281538 | 9/2013 |
| CN | 103392340 | 11/2013 |
| CN | 103430540 | 12/2013 |
| CN | 103957412 | 7/2014 |
| CN | 104221381 | 12/2014 |
| CN | 104244007 | 12/2014 |
| CN | 104378644 | 2/2015 |
| EP | 2664070 | 11/2013 |
| EP | 2924996 | 9/2015 |
| EP | 3085083 | 10/2016 |
| EP | 3146717 | 3/2017 |
| GB | 2114404 | 8/1983 |
| JP | 2002-094805 | 3/2002 |
| JP | 2007-053561 | 3/2007 |
| JP | 2009-147807 | 7/2009 |
| JP | 2009-260473 | 11/2009 |
| JP | 2015-516759 | 6/2015 |
| KR | 20150003239 | 1/2015 |
| RU | 2407223 | 12/2010 |
| RU | 2420021 | 5/2011 |
| WO | WO 2007/119198 | 10/2007 |
| WO | WO 2008/036112 | 3/2008 |
| WO | WO 2010/085899 | 8/2010 |
| WO | WO 2012/146320 | 11/2012 |
| WO | WO 2012/159306 | 11/2012 |
| WO | WO 2012/174990 | 12/2012 |
| WO | WO 2013/009896 | 1/2013 |
| WO | WO 2013/072484 | 5/2013 |
| WO | WO 2013/107906 | 7/2013 |
| WO | WO 2013/108922 | 7/2013 |
| WO | WO 2013/128010 | 9/2013 |
| WO | WO 2013/148002 | 10/2013 |
| WO | WO 2013/154687 | 10/2013 |
| WO | WO 2013/159643 | 10/2013 |
| WO | WO 2013/160696 | 10/2013 |
| WO | WO 2014/053099 | 4/2014 |
| WO | WO 2014/108088 | 7/2014 |
| WO | WO 2014/166104 | 10/2014 |
| WO | WO 2014/205067 | 12/2014 |
| WO | WO 2015/004441 | 1/2015 |
| WO | WO 2015/006724 | 3/2015 |
| WO | WO 2015/090219 | 6/2015 |
| WO | WO 2015/114322 | 8/2015 |
| WO | WO 2015/179814 | 11/2015 |

OTHER PUBLICATIONS

Alshina et al., "AhGS: On context modeling simplification for Intra_bc_flag coding," JCTVC-O0073, pp. 1-3 (Oct. 2013).

An, "Column-Based RLE in Row-Oriented Database," Proc. of Cyber-Enabled Distributed Computing and Knowledge Discovery, pp. 309-315 (Oct. 2009).

Anjanappa, "Performance Analysis and Implementation of Mode Dependent DCT/DST in H.264/AVC," University of Texas at Arlington, Master of Science in Electrical Engineering Thesis, pp. 1-95 (Dec. 2012).

Balle et al., "Extended Texture Prediction for H.264/AVC Intra Coding," *IEEE Int'l Conf. on Image Processing*, pp. 93-96 (Sep. 2007).

Budagavi et al., "AHG8: Video coding using Intra motion compensation," JCTVC-M0350, 3 pp. (Apr. 2013).

Cha et al., "An Efficient Combined Inter and Intra Prediction Scheme for Video Coding," *Asia-Pacific Signal and Information Processing Conf.*, pp. 1-5 (Oct. 2011).

Chen et al., "AHG8: Line-based Intra Block Copy," JCTVC-O0205r3, pp. 1-4 (Oct. 2013).

Chen et al., "AHG8: Pseudo-PU-based Intra Block Copy," JCTVC-O0205, pp. 1-4 (Oct. 2013).

Chen et al., "Optimizing INTRA/INTER Coding Mode Decisions," *Proc. Int'l Symp. on Multimedia Information Processing*, pp. 561-568 (Dec. 1997).

Communication pursuant to Article 94(3) EPC dated Jan. 5, 2018, from European Patent Application No. 14903497.7, 8 pp.

Cugnini, "3D CineCast—A Curation About New Media Technologies," downloaded from the World Wide Web, 3 pp. (Jan. 2013).

Dai et al., "Efficient Block-Based Intra Prediction for Image Coding with 2D Geometrical Manipulations," *Proc. of the 15th IEEE*

(56) References Cited

OTHER PUBLICATIONS

*International Conference on Image Processing*, pp. 2916-2919 (Oct. 2008).
De Forni et al., "On the Benefits of Leaf Merging in Quad-Tree Motion Models," *IEEE Intl Conf. on Image Processing*, vol. 2, 4 pp. (Sep. 2005).
Decision on Grant dated Jul. 12, 2018, from Russian Patent Application No. 2016114272, 13 pp.
Decision to Grant dated Apr. 3, 2018, from Japanese Patent Application No. 2016-522740, 6 pp.
European Search Report, European Application No. 14884822.9, 6 pages, Feb. 3, 2017.
European Examination Report, European Application No. 14884822.9, 6 pages, Feb. 21, 2017.
Final Office Action dated Nov. 14, 2016, from U.S. Appl. No. 14/176,510, 18 pp.
Final Office Action dated Jun. 12, 2018, from U.S. Appl. No. 15/640,074, 11 pp.
Flynn et al, "BoG report on Range Extensions topics," JCTVC-00352, 48 pp. (Oct. 2013).
Flynn et al., "High Efficiency Video Coding (HEVC) Range Extensions text specification: Draft 5," JCTVC-O1005_v3, pp. 1-347 (Oct. 2013).
Flynn et al., "High Efficiency Video Coding (HEVC) Range Extensions text specification: Draft 6," JCTVC-P1005, pp. 1-355 (Jan. 2014).
Flynn et al., "Text of ISO/IEC 23008-2:201x/DAM1 HEVC Range Extensions," ISO/IEC JTC1/SC29/WG11 N13763, pp. 1-321 (Aug. 2013).
Fonseca et al., "Open-Loop Prediction in H.264/AVC for High Definition Sequences," *Proc. Brazilian Telecommunication Symp.*, pp. 1-4 (Sep. 2007).
Gisquet et al., "SCCE3 Test A.3: palette stuffing," JCTVC-R0082, pp. 1-5 (Jun. 2014).
"H.264 Video Compression," *Visual Computing Systems*, CMU 15-869, pp. 1-29 (Fall 2014).
He et al., "Non-CE6: Redundancy removal and simplification for Palette coding," JCTVC-S0173, 7 pp. (Oct. 2014).
Hu et al., "Screen Content Coding for HEVC Using Edge Modes," *IEEE Int'l Conf. on Acoustics, Speech and Signal Processing*, pp. 1-7 (May 2013).
Hwang et al., "Fast Intra Prediction Mode Selection Scheme Using Temporal Correlation in H.264," *Proc. Int'l Conf. of the Tencon*, pp. 1-5 (Nov. 2005).
International Preliminary Report on Patentability dated Apr. 13, 2017, from International Patent Application No. PCT/CN2014/087885, 6 pp.
International Preliminary Report on Patentability dated Sep. 15, 2016, from International Patent Application No. PCT/CN2014/072774, 7 pp.
International Preliminary Report on Patentability dated Dec. 21, 2017, from International Patent Application No. PCT/CN2015/081039, 5 pp.
International Search Report and Written Opinion dated Dec. 5, 2014, from International Patent Application No. PCT/CN2014/072774, 15 pp.
International Search Report and Written Opinion dated Mar. 1, 2016, from International Patent Application No. PCT/CN2015/081039, 11 pp.
International Search Report and Written Opinion dated Jun. 15, 2015, from International Patent Application No. PCT/CN2014/087885, 13 pp.
International Search Report and Written Opinion dated Apr. 13, 2015, from International Patent Application No. PCT/US2015/014461, 11 pp.
ISO/IEC 14496-10, "Information technology—Coding of audio-visual objects—Part 10: Advanced Video Coding," 720 pp. (May 2012).
ITU-T Recommendation T.800, "Information technology—JPEG 2000 image coding system: Core coding system," 217 pp. (Aug. 2002).
Iwata et al., "Intra Prediction based on Repetitive Pixel Replenishment with Adaptive Block Size," JCTVC-D251, pp. 1-4 (Jan. 2011).
Iwata et al., "Intra Texture Prediction Based on Repetitive Pixel Replacement," *IEEE Int'l Conf. on Image Processing*, pp. 2933-2936 (Sep. 2012).
Jin et al., "Combined Inter-Intra Prediction for High Definition Video Coding," *Proc. Picture Coding Symp.*, pp. 1-4 (Nov. 2007).
Joshi et al., "High Efficiency Video Coding (HEVC) Screen Content Coding: Draft 3," JCTVC-T1005, 563 pp. (Feb. 2015).
Kim et al., "High Efficiency Video Coding (HEVC) Test Model 13 (HM13) Encoder Description," JCTVC-O1002, 36 pp. (Oct. 2013).
Kwon et al., "AHG5: Fast Encoding Using Early Skipping of Intra Block Copy (IntraBC) Search," JCTVC-O0245, 12 pp. (Oct. 2013).
Kwon et al., "Non-RCE3: Intra Motion Compensation with Variable Length Intra MV Coding," JCTVC-N0206, 11 pp. (Jul. 2013).
Kwong et al., "RCE3: Results of test 3.3 in intra motion compensation," JCTVC-N0205, 8 pp. (Jul. 2013).
Lai et al., "AHG14: Intra Block Copy reference area for Wavefront Parallel Processing.(WPP)," JCTVC-S0101, 4 pp. (Oct. 2014).
Lainema et al., "AHG5: Sample masking for intra block copy," JCTVC-O0351, 3 pp. (Oct. 2013).
Lainema et al., "Intra Coding of the HEVC Standard," *IEEE Trans. on Circuits and Systems for Video Technology*, vol. 22, Issue 12, pp. 1792-1801 (Dec. 2012).
Lan et al., "Intra and Inter coding tools for screen contents," JCTVC-E145, 11 pp. (Mar. 2011).
Laroche et al., "AHG5: Motion prediction for Intra Block Copy," JCTVC-O0122, 5 pp. (Oct. 2013).
Laroche et al., "AHG14: On IBC Constraint for Wavefront Parallel Processing," JCTVC-S0070, 5 pp. (Oct. 2014).
Laroche et al., "Text and results for block vector predictor for intra block copy," JCTVC-P0304_r1, 3 pp. (Jan. 2014).
Le Meur et al., "Video compression Beyond H.264, HEVC," University of Rennes, Powerpoint presentation, 65 pp. (Nov. 2011).
Li et al., "Hash-based intraBC search," JCTVC-Q0252, 2 pp. (Mar. 2014).
Li et al., "On Intra BC mode," JCTVC-00183 r1, 12 pp. (Oct. 2013).
Li et al., "On the Palette Escape Pixel Coding," JCTVC-U0052, 9 pp. (Jun. 2015).
Li et al., "RDPCM operation unification and cleanup," JCTVC-00185, 6 pp. (Oct. 2013).
Liao et al., "A Low Complexity Architecture for Video Coding with Overlapped Block Motion Compensation," *IEEE Int'l Conf. on Image Processing*, pp. 2041-2044 (Sep. 2010).
Marpe et al., "Context-Based Adaptive Binary Arithmetic Coding in the H.264/AVC Video Compression Standard," *IEEE Trans. on Circuits and Systems for Video Technology*, vol. 13, No. 7, pp. 620-636 (Jul. 2003).
Marpe et al., "Video Compression Using Nested Quadtree Structures, Leaf Merging and Improved Techniques for Motion Representation and Entropy Coding," *IEEE Trans. on Circuits and Systems for Video Technology*, vol. 20, Issue 12, 10 pp. (Dec. 2010).
McCann et al., "Samsung's Response to the Call for Proposals on Video Compression Technology," JCTVC-A124, 40 pp. (Apr. 2010).
Min et al., "Non-RCE3: Intra motion compensation for screen contents," JCTVC-N0285, 3 pp. (Jul. 2013).
Misra et al., "Using flat scaling lists for escape coded palette pixels," JCTVC-S0139_r1, 4 pp. (Oct. 2014).
Naccari et al., "AHG 8 Cross-check for JCTVC-N0231: Intra mode coding for screen contents," JCTVC-N0322, 3 pp. (Jul. 2013).
Notice of Allowance dated Apr. 12, 2017, from U.S. Appl. No. 14/176,510, 10 pp.
Notice on the First Office Action dated Sep. 29, 2017, from Chinese Application No. 201480029702.0, 15 pages.
Notice on the Second Office Action dated Mar. 20, 2018, from Chinese Application No. 201480029702.0, 6 pages.
Notice on the First Office Action dated May 3, 2018, from Chinese Patent Application No. 201480071878.2, 14 pp.
Notice on the Second Office Action dated Oct. 25, 2018, from Chinese Patent Application No. 201380080237.9, 6 pp.

(56) References Cited

OTHER PUBLICATIONS

Notification of Reasons for Refusal dated Jun. 5, 2018, from Japanese Patent Application No. 2017-517017, 12 pp.
Office Action and Search Report dated Jul. 17, 2018, from Russian Patent Application No. 2017110397, 11 pp.
Office Action dated Feb. 15, 2017, from U.S. Appl. No. 14/176,510, 10 pp.
Office Action dated Sep. 29, 2016, from U.S. Appl. No. 14/176,510, 15 pp.
Office Action dated Apr. 19, 2018, from U.S. Appl. No. 15/120,389, 36 pp.
Office Action dated Jan. 25, 2018, from U.S. Appl. No. 15/640,074, 10 pp.
Ohm et al., "Comparison of the Coding Efficiency of Video Coding Standards—Including High Efficiency Video Coding (HEVC)," *IEEE Trans. on Circuits and Systems for Video Technology*, vol. 22, No. 12, pp. 1669-1684 (Dec. 2012).
Oudin et al., "Block Merging for Quadtree-Based Video Coding," *IEEE Int'l Conf. on Multimedia and Expo*, 6 pp. (Jul. 2011).
Pang et al., "AhG5: Constrained intra prediction for intra block copying," JCTVC-O0155, 6 pp. (Oct. 2013).
Pang et al., "AhG5: Intra block copying with padding," JCTVC-O0157_v5, 6 pp. (Oct. 2013).
Pang et al., "Non-RCE3: Intra Motion Compensation with 2-D MVs," JCTVC-N0256 v3, 12 pp. (Jul. 2013).
Pang et al., "Non-RCE3: Pipeline Friendly Intra Motion Compensation," JCTVC-N0254, 9 pp. (Jul. 2013).
"Pixel Padding Value and Pixel Padding Range Limit," downloaded from World Wide Web, 2 pp. (downloaded on Dec. 5, 2014).
Rapaka et al., "On parallel processing capability of intra block copy," JCTVC-S0220, 5 pp. (Oct. 2014).
Robert et al., "Improving Intra mode coding in H.264/AVC through block oriented transforms," *IEEE Workshop on Multimedia Signal Processing*, 5 pp. (Oct. 2006).
Sahin et al., "An Efficient Hardware Architecture for H.264 Intra Prediction Algorithm," *Proc. of Design, Automation & Test in Europe Conf. & Exhibition*, 6 pp. (Apr. 2007).
Sarwer et al., "Improved Intra Prediction of H.264/AVC," *Effective Video Coding for Multimedia Applications*, pp. 39-54 (Apr. 2011).
Saxena et al., "Mode Dependent DCT/DST for Intra Prediction in Block-Based Image/Video Coding," *IEEE Int'l Conf. on Image Processing*, pp. 1685-1688 (Sep. 2011).
Saxena et al., "Rext: On transform selection for Intra-Block-Copy blocks," JCTVC-O0053, pp. 1-3 (Oct. 2013).
Sharman et al., "AGH5: Intra-block-copy in Non-4:4:4 Formats," JCTVC-Q0075, 5 pp. (Mar. 2014).
Sole et al., "HEVC Range Extensions Core Experiment 3 (RCE3): Intra block copy refinement," JCTVC-O1123, 6 pp. (Oct. 2013).
Sole et al., "Non-CE6: Delta QP signalling for palette," JCTVC-S0043-r2, 3 pp. (Oct. 2014).
Sullivan et al., "Meeting report of the 14th meeting of the Joint Collaborative Team on Video Coding (JCT-VC), Vienna, AT Jul. 25-Aug. 2, 2013," JCTVC-N_Notes_dA, 162 pp. (Jul. 2013).
Sullivan et al., "Meeting report of the 21st meeting of the Joint Collaborative Team on Video Coding (JCT-VC), Warsaw, PL, Jun. 19-26, 2015," JCTVC-U_Notes_dC, 121 pp. (Jun. 2015).
Sun et al., "AHG10: A triplet palette mode combining JCTVC-P0108 and JCTVC-P0198," JCTVC-Q0083, pp. 1-9 (Mar. 2014).
Sun et al., "Non-RCE4: Cross-CU major color index prediction," JCTVC-P0093r2, pp. 1-5 (Jan. 2014).
Supplementary European Search Report dated Nov. 20, 2017, from European Patent Application No. 14903497.7, 8 pp.
Supplementary European Search report dated Oct. 22, 2018, from European Patent Application No. 15894584.0, 9 pp.
Tseng et al., "A Motion Vector Coding Scheme Based on Bottom-Up Merging Procedure," *Int'l Conf. on Advances in Multimedia*, pp. 125-129 (Jul. 2009).
Xu et al., "Intra-predictive Transforms for Image Coding," *IEEE Int'l Symp. on Circuits and Systems*, pp. 2822-2825 (May 2009).
Xu et al., "On unification of intra block copy and inter-picture motion compensation," JCTVC-Q0132, 14 pp. (Jan. 2014).
Yang, "HEVC (High Efficiency Video Coding)," TaipeiTech, CSIE Department, 66 pp. (downloaded on Dec. 4, 2014).
Yang et al., "Remote Dynamic Three-Dimensional Scene Reconstruction," *PLOS One*, vol. 8, Issue 5, 12 pp. (May 2013).
Yu et al., "New Intra Prediction Using Intra-Macroblock Motion Compensation," JVT-C151, 3 pp. (May 2002).
Zhang et al., "Motion Vector Derivation of Deformable Block," *IEEE Int'l Conf. on Image Processing*, pp. 1549-1552 (Sep. 2012).
Zhu et al., "AMP for Intra BC prediction," JCTVC-Q0135, 3 pp. (Mar. 2014).
Zhu et al., "Initialization of block vector predictor for intra block copy," JCTVC-P0217-v2, 7 pp. (Jan. 2014).
Zhu et al., "Non-RCE3 subtest B.2-Results and Search Methods for Intra block copying for CU-level block vectors with TU-level prediction processing," JCTVC-P0218, 3 pp. (Jan. 2014).
Zhu et al., "Ping-Pong block vector predictor for intra block copy," JCTVC-Q0134, 5 pp. (Mar. 2014).
Zhu et al., "Screen content coding using 2-D dictionary mode," JCTVC-O0355, 4 pp. (Oct. 2013).
Zou et al., "CE 1 Related: On Escape Pixel Coding for Palette Mode," JCTVC-T0112, 5 pp. (Feb. 2015).
Zou et al., "CE 1 Related: On Escape Pixel Coding for Palette Mode," JCTVC-T0112r1, 10 pp. (Feb. 2015).
Zou et al., "View Synthesis Prediction Using Skip and Merge Candidates for HEVC-based 3D Video Coding," *IEEE Int'l Symp. on Circuits and Systems*, 6 pp. (May 2013).
Clare et al., "Wavefront Parallel Processing for HEVC Encoding and Decoding," JCTVC-F274, 16 pp. (Jul. 2011).
Guo et al., "Color Palette for Screen Content Coding," ICIP 2014, 5 pp. (2014).
Guo, "RCE3: Results of Test 3.1 on Palette Mode for Screen Content Coding," JCTVC-N0247, 7 pp. (Jul. 2013).
Kwon et al., "Fast Intra Block Copy (IntraBC) Search for HEVC Screen Content Coding," IEEE Int'l Symp. on Circuits and Systems, pp. 9-12 (Jun. 2014).
Lai et al., "Non-RCE4: Major Color Table (Palette) Merge from Above and Left CU," JCTVC-P0152_r2, 7 pp. (Jan. 2014).
Lai et al., "Non-RCE4: Major Color Table (Palette) Sharing," JCTVC-P0153, 6 pp. (Jan. 2014).
Notice of Reasons for Rejection dated Sep. 12, 2017, from Japanese Patent Application No. 2016-522740, 13 pp.
Notice on the First Office Action and Search Report dated Feb. 24, 2018, from Chinese Patent Application No. 201380080237.9, 14 pp.
Office Action dated Mar. 28, 2018, from Australian Patent Application No. 2013403225, 3 pp.
Office Action dated Feb. 8, 2018, from Mexican Patent Application No. MX/a/2016/004707, 4 pp.
Office Action dated Aug. 25, 2017, from Russian Patent Application No. 2016114272, 8 pp.
Office Action dated Mar. 23, 2018, from Russian Patent Application No. 2016114272, 3 pp.
Pang et al., "Non-RCE3: 2-D MV Supported Intra Motion Compensation," JCTVC-N0256, 5 pp. (Jul. 2013).
Seregin et al., "Non-SCCE3: Palette Predictor Resetting," JCTVC-R0229r1, 4 pp. (Jun. 2014).
Yu et al., "New Intra Prediction Using Intra-Macroblock Motion Compensation," JVT-C151, 10 pp. (May 2002).
Bankoski et al., "VP8 Data Format and Decoding Guide," RFC 6386, 304 pp. (Nov. 2011).
Flynn et al., "High Efficiency Video Coding (HEVC) Range Extensions text specification: Draft 3," JCTVC-M1005_v1, 315 pp. (Apr. 2013).
Flynn et al., "High Efficiency Video Coding (HEVC) Range Extensions text specification: Draft 4," JCTVC-N1005_v1, 322 pp. (Apr. 2013).
Guo et al., "AHG8: Major-color-based screen content coding," JCTVC-O0182, 7 pp. (Oct. 2013).
Guo et al., "Evaluation of Palette Mode Coding on HM-12.0+Rext-4.1," JCTVC-O0218, 6 pp. (Oct. 2013).

(56) References Cited

OTHER PUBLICATIONS

Guo, "RCE3: Summary Report of HEVC Range Extensions Core Experiment 3 on Intra Coding Methods for Screen Content," JCTVC-N0036, 4 pp. (Jul. 2013).
International Search Report and Written Opinion dated Aug. 5, 2014, from International Patent Application No. PCT/CN2013/085166, 20 pp.
ISO/IEC 11172-2, "Information technology—Coding of moving pictures and associated audio for digital storage media at up to about 1,5 Mbit/s—Part 2: Video," 122 pp. (Aug. 1993).
ISO/IEC 14496-2, "Information Technology—Coding of Audio-Visual Objects: Visual," ISO/IEC JTC1/SC29/WG11 N2202, 327 pp. (Mar. 1998).
ITU-T Recommendation H.261, "Video Codec for Audiovisual Services at p × 64 kbits," 29 pp. (Mar. 1993).
ITU-T Recommendation H.262, "Generic Coding of Moving Pictures and Associated Audio Information: Video," 218 pp. (Jul. 1995).
ITU-T Recommendation H.263, "Video coding for low bit rate communication," 167 pp. (Feb. 1998).
ITU-T Recommendation H.264, "Advanced video coding for generic audiovisual services," 680 pp. (Jan. 2012).
ITU-T Recommendation H.265, "High efficiency video coding," 317 pp. (Apr. 2013).
Joshi et al., "AHG8: Use of inter RDPCM for blocks using intra block copy mode," JCTVC-O0170, 2 pp. (Oct. 2013).
Lan et al., "Compress Compund Images in H.264/MPGE-4 AVC by Exploiting Spatial Correlation," *IEEE Trans. on Image Processing*, vol. 19, No. 4, pp. 946-957 (Apr. 2010).
Lan et al., "Compression of Compound Images by Combining Several Strategies," *IEEE Int'l Workshop on Multimedia Signal Processing*, 6 pp. (Oct. 2011).
Lan et al., "Improving Depth Compression in HEVC by Pre/Post Processing," *IEEE Int'l Conf. on Multimedia and Expo Workshop*, pp. 611-616 (Jul. 2012).
Pan et al., "A Low-Complexity Screen Compression Scheme,"*VCIP*, 6 pp. (Nov. 2012).
Pan et al., "A Low-Complexity Screen Compression Scheme for Interactive Screen Sharing," *IEEE Trans. on Circuits and Systems for Video Technology*, vol. 23, No. 6, pp. 949-960 (Jun. 2013).
Peng et al., "Exploiting Inter-frame Correlations in Compound Video Coding," *IEEE Visual Communications and Image Processing*, 4 pp. (Nov. 2011).
Saxena et al., "HEVC Range Extensions Core Experiment 3 (RCE3): Intra Prediction techniques," JCTVC-N1123, 7 pp. (Jul. 2013).
Shen et al., "A High-Performance Remote Computing Platform," *IEEE Int'l Conf. on Pervasive Computing and Communications*, 6 pp. (Mar. 2009).
SMPTE Standard, "VC-1 Compressed Video Bitstream Format and Decoding Process," SMPTE 421M-2006, 493 pp. (Feb. 2006).
Sullivan et al., "Overview of the High Efficiency Video Coding (HEVC) Standard," *IEEE Trans. on Circuits and Systems for Video Technology*, vol. 22, No. 12, pp. 1649-1668 (Dec. 2012).
Xu et al., "Non-RCE3: base color merging for MBCIM," JCTVC-N0235, 7 pp. (Jul. 2013).
Zhu et al., "AhG8: Screen Content Coding with Multi-stage Base Color and Index Map," JCTVC-M0330, 6 pp. (Apr. 2013).
Zhu et al., "Template-based palette prediction," JCTVC-N0169, 6 pp. (Apr. 2013).
Dai et al., "Combined Inter-Frame and Inter-Color Prediction for Color Video Denoising," *IEEE Int'l Conf. on Multimedia and Expo*, pp. 884-889 (Jul. 2012).
International Preliminary Report on Patentability dated Apr. 28, 2016, from International Patent Application No. PCT/CN2013/085166, 11 pp.
Kang et al., "Efficient Dictionary Based Video Coding with Reduced Side Information," *Int'l Symp. on Circuits and Systems*, 6 pp. (May 2011).

Meenderinck et al., "Parallel Scalability of H.264," *Workshop on Programmability Issues for Multi-Core Computers*, 12 pp. (Jan. 2008).
Pourazad et al., "HEVC: The New Gold Standard for Video Compression," *IEEE Consumer Electronics Magazine*, pp. 36-46 (Jul. 2012).
Pu et al., "SCCE3: Test B.12—Binarization of Escape Sample and Palette Index," JCTVC-R0065, 3 pp. (Jun. 2014).
Xiu et al., "Palette-based Coding in the Screen Content Coding Extension of the HEVC Standard," *IEEE Data Compresion Conf.*, pp. 253-262 (Apr. 2015).
Zhao et al., "Efficient Realization of Parallel HEVC Intra Encoding," Int'l Workshop on Programmability on Emerging Multimedia Systems and Applications, 6 pp. (Jul. 2013).
Communication pursuant to Article 94(3) EPC dated Feb. 8, 2019, from European Patent Application No. 14884822.9, 5 pp.
Decision of Refusal dated Jan. 22, 2019, from Japanese Patent Application No. 2017-517017, 10 pp.
Decision on Grant dated Nov. 23, 2018, from Russian Patent Application No. 2017110397, 18 pp.
Notice on Grant of Patent dated Mar. 6, 2019, from Chinese Patent Application No. 201380080237.9, 4 pp.
Notice on the First Office Action dated Nov. 28, 2018, from Chinese Patent Application No. 201580043420.0, 22 pp.
Notice on the Second Office Action dated Dec. 4, 2018, from Chinese Patent Application No. 201480071878.2, 14 pp.
Office Action dated Oct. 11, 2018, from Mexican Patent Application No. MX/a/2016/004707, 5 pp.
Office Action dated Nov. 7, 2018, from U.S. Appl. No. 15/640,074, 13 pp.
Examination Report No. 1 dated Apr. 5, 2019, from Australian Patent Application No. 2014408228, 4 pp.
Final Office Acton dated Jun. 24, 2019, from U.S. Appl. No. 15/640,074, 13 pp.
Ma et al., "Advanced Screen Content Coding Using Color Table and Index Map," *IEEE Trans. on Image Processing*, vol. 23, Issue 10, pp. 4399-4412 (Oct. 2014).
Notice on the Third Office Action dated May 7, 2019, from Chinese Patent Application No. 201480071878.2, 10 pp.
Office Action dated Mar. 8, 2019, from U.S. Appl. No. 15/640,074, 13 pp.
Office Action dated Apr. 22, 2019, from U.S. Appl. No. 15/515,559, 14 pp.
Office Action dated May 13, 2019, from U.S. Appl. No. 15/735,134, 48 pp.
Sze et al., "Entropy Coding in HEVC," 67 pp. (2014).
Brittain et al., "Grayscale Two-Dimensional Lempel-Ziv Encoding," Image Analysis and Recognition Lecture Notes in Computer Science, Springer, Berlin, DE, pp. 328-334, Jan. 1, 2005.
Chang et al., "Intra Line Copy for HEVC Screen Content Coding," 2014 Annual Summit and Conference Asia-Pacific Signal and Information Processing Association (APSIPA), http://ieeexplore.ieee.org/document/7041533/, Dec. 12, 2014, 8 pages (retrieved on Jan. 11, 2017).
Chen et al., "Description of Screen Content Coding Technology Proposal by NCTU and ITRI International," JCTVC-Q0032-r1, 26 pp. (Mar. 2014).
Chen et al., "Description of Screen Content Coding Technology Proposal by Qualcomm," JCTVC-Q0031, 18 pp. (Mar. 2014).
Cohen et al., "Description of Screen Content Coding Technology Proposal by Mitsubishi Electric Corporation," JCTVC-Q0036, 25 pp. (Mar. 2014).
Communication pursuant to Rules 161(2) and 162 EPC dated May 23, 2016, from European Patent Application No. 13895646.1, 2 pp.
Communication pursuant to Rules 70(2) and 70a(2) EPC dated May 4, 2017, from European Patent Application No. 13895646.1, 1 p.
Ding et al., "Enable Efficient Compound Image Compression in H.264/AVC Intra Coding," IEEE Int'l Conf. on Image Processing, 4 pp. (Sep. 2007).
Extended European Search Report dated Apr. 13, 2017, from European Patent Application No. 13895646.1, 9 pp.
Flynn et al., "High Efficiency Video Coding (HEVC) Screen Content Coding: Draft 1," JCTVC-R1005-v2, 360 pp. (Aug. 2014).

(56) References Cited

OTHER PUBLICATIONS

Guo et al., "Palette Mode for Screen Content Coding," JCTVC-M0323, 11 pp. (Apr. 2013).

Lai et al., Description of Screen Content Coding Technology Proposal by MediaTek, JCTVC-Q0033_r1, 31 pp. (Mar. 2014).

Lan et al., "Screen Content Coding," JCTVC-B084_r1, 10 pp. (2010).

Lan et al., "Screen Content Coding Results Using TMuC," JCTVC-C276_r2, 6 pp. (2010).

Li et al., "Description of Screen Content Coding Technology Proposal by Microsoft," JCTVC-Q0035, 27 pp. (Mar. 2014).

Li et al., "On WPP with Palette Mode and Intra BC Mode," JCTVC-S0088, 8 pp. (Oct. 2014).

Lin et al., "Compound Image Compression for Real-Time Computer Screen Image Transmission," *IEEE Trans. on Image Processing*, vol. 14, No. 8, pp. 993-1005 (Aug. 2005).

Lin et al., "Pseudo-2D-Matching Based Dual-Coder Architecture for Screen Contents Coding," 2013 IEEE International Conference on Multimedia and Expo Workshops (ICMEW), http://ieeexplore.ieee.org/stamp/stamp.jsp?arnumber=6618315, Jul. 15-19, 2013, 4 pages (retrieved Jan. 11, 2017).

Lu et al., "Virtualized Screen: A Third Element for Cloud-Mobile Convergence," IEEE Multimedia vol. 18, Issue 2, 8 pp. (Feb. 2011).

Ma et al., "Description of Screen Content Coding Technology Proposal by Huawei Technologies, Inc.," JCTVC-Q0034, 14 pp. (Mar. 2014).

Miao et al., "Layered Screen Video Coding Leveraging Hardware Video Codec," IEEE Int'l Conf. on Multimedia and Expo, 6 pp. (Jul. 2013).

Misra et al., "Modifications to Palette Coding for Tiles/Slices/Dependent Slices/Wavefronts," JCTVC-R0233, 4 pp. (Jun. 2014).

Misra et al., "Using the Wavefront Store-and-Sync Design for Palette Table Prediction Variables," JCTVC-S0141_r1, 6 pp. (Oct. 2014).

Mrak et al., "Improving Screen Content Coding in HEVC by Transform Skipping," Proc. European Signal Processing Conf., 5 pp. (Aug. 2012).

Rodrigues et al., "Improving H.264/AVC Inter Compression with Multiscale Recurrent Patterns," 2006 IEEE International Conference on Image Processing, http://ieeexplore.ieee.org/stamp/stamp.jsp?arnumber=4106789, Oct. 8-11, 2006, pp. 1353-1356 (retrieved Jan. 9, 2017).

Salomon, "Data Compression: The Complete Reference," In 2007, Springer, pp. 241-246.

Shen et al., "Classification-Based Adaptive Compression Method for Computer Screen Image," IEEE Int'l Conf. on Multimedia and Expo Workshops, 6 pp. (Jul. 2012).

Shen et al., "Low-Cost Real-Time Screen Sharing to Multiple Clients," IEEE Int'l Conf. on Multimedia and Expo, 6 pp. (Jul. 2010).

Strom et al., "Medical Image Compression with Lossless Regions of Interest," Signal Processing, vol. 59, Issue 2, 17 pp. (Jun. 1997).

Sullivan et al., "Meeting Report of the 18th Meeting of the Joint Collaborative Team on Video Coding (JCT-VC), Sapporo, JP, Jun. 30-Jul. 9, 2014," JCTVC-R_Notes_dE, 199 pp. (Jun. 2014).

Sullivan et al., "Meeting Report of the 19th Meeting of the Joint Collaborative Team on Video Coding (JCT-VC), Strasburg, FR, Oct. 17-24, 2014," JCTVC-S1000, 203 pp. (Oct. 2014).

Xiu et al., "Description of Screen Content Coding Technology Proposal by InterDigital," JCTVC-Q0037, 30 pp. (Mar. 2014).

Zhang et al., "Screen Content Coding by Combined Full-chroma LZMA and Subsampled-chroma HEVC," Journal of Electronics and Information Technology, vol. 35, No. 1, pp. 196-202, Feb. 17, 2014.

Zhu et al., "RCE3 Test 2: Multi-stage Base Color and Index Map," JCTVC-N0287, 8 pp. (Jul. 2013).

* cited by examiner

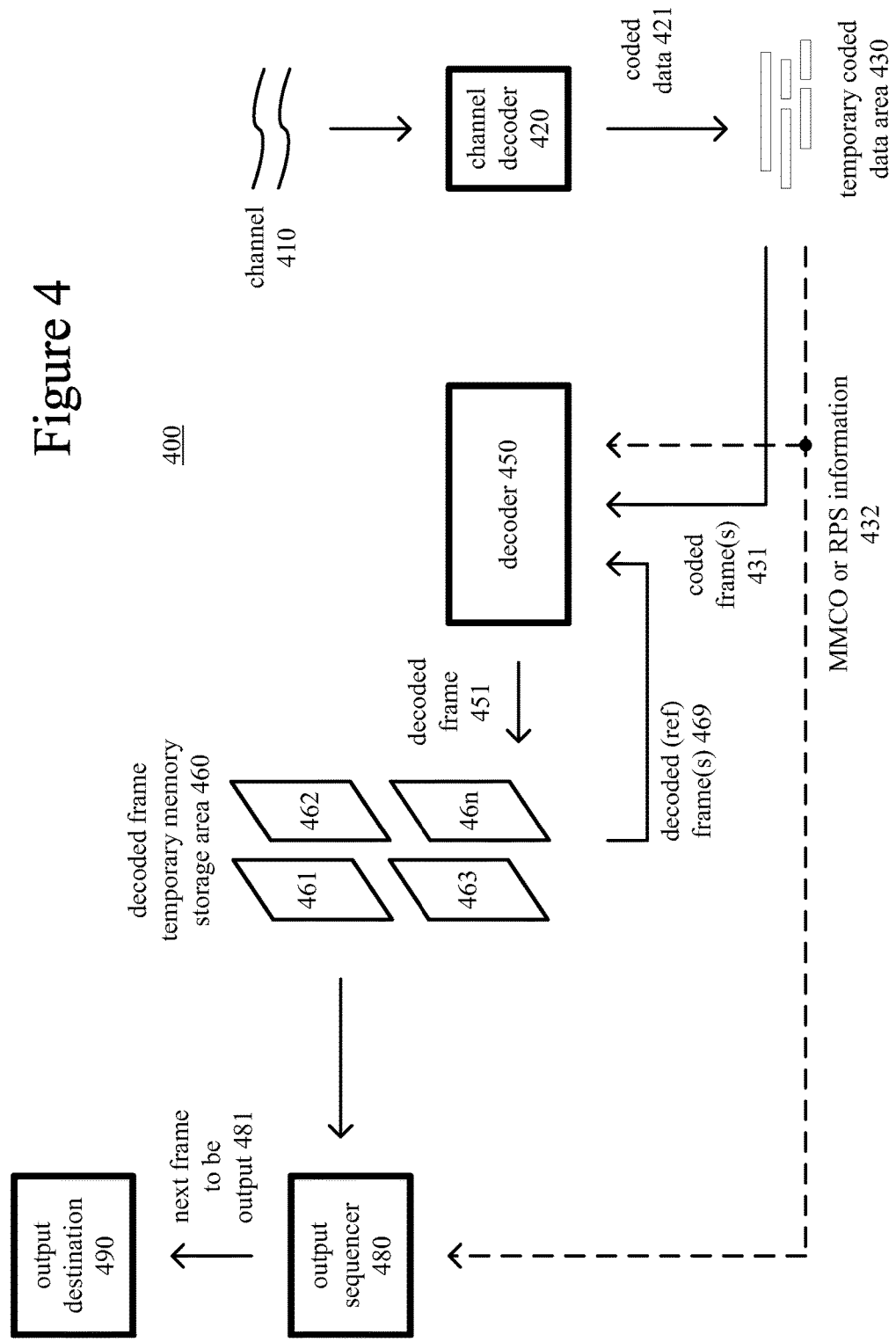

500

600

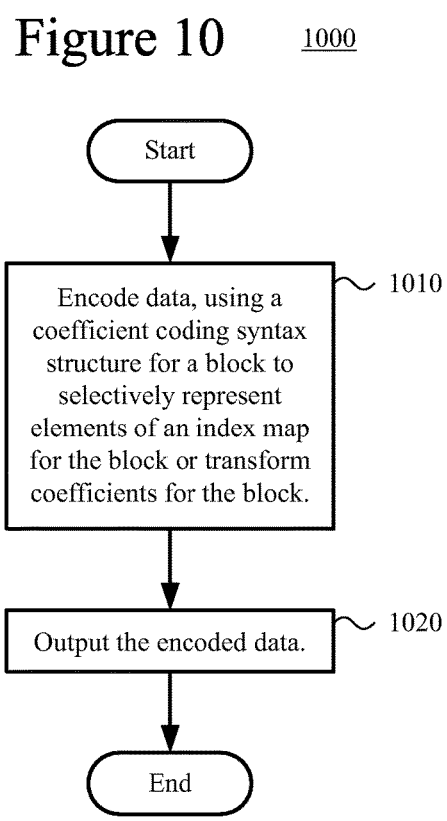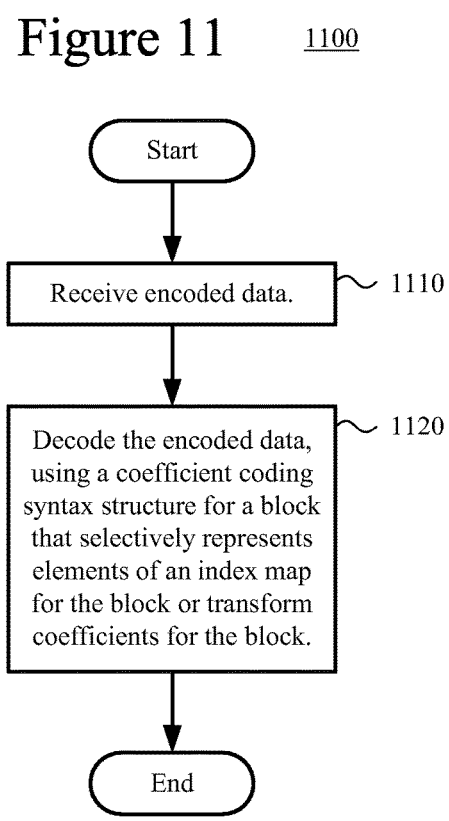

Figure 13

1300 block (1310) of index values $n$

| 0 | 0 | 1 | 1 | 2 | 2 | 3 |
| 4 | 0 | 1 | 1 | 2 | 2 | 3 |
| 4 | 0 | 1 | 1 | 2 | 2 | 3 |
| 4 | 0 | 1 | 1 | 2 | 2 | 3 |
| 4 | 0 | 1 | 1 | 2 | 2 | 3 |
| 4 | 0 | 1 | 1 | 2 | 2 | 3 |
| 4 | 0 | 1 | 1 | 5 | 5 | 3 |
| 4 | 0 | 1 | 1 | 5 | 5 | 3 | mapping to packed index values if $n$ is even, $n_{packed} = -n/2$
if $n$ is odd, $n_{packed} = (n+1)/2$ mapping to index values if $n_{packed}$ is $\leq 0$, $n = -2 \ast n_{packed}$
otherwise, $n = 2 \ast n_{packed} - 1$ block (1330) of packed index values $n_{packed}$

| 0 | 0 | 0 | 1 | 1 | -1 | 2 |
| -2 | 0 | 0 | 1 | 1 | -1 | 2 |
| -2 | 0 | 0 | 1 | 1 | -1 | 2 |
| -2 | 0 | 0 | 1 | 1 | -1 | 2 |
| -2 | 0 | 0 | 1 | 1 | -1 | 2 |
| -2 | 0 | 0 | 1 | 1 | -1 | 2 |
| -2 | 0 | 0 | 1 | 3 | 3 | 2 |
| -2 | 0 | 0 | 1 | 3 | 3 | 2 |

Figure 16    1600 block (1610) of index values $n$ vertical prediction $n_{resid}(i,j) = n(i,j) - n(i,j-1)$ $n(i,j) = n_{resid}(i,j) + n(i,j-1)$ block (1630) of index residual values $n_{resid}$

Figure 18  1800
| packed index value | | predictor | | packed index residual value |
|---|---|---|---|---|
| 0 0 0 0 0 1 1 1 | ⊗ | 0 0 0 0 0 1 1 0 | = | 0 0 0 0 0 0 0 1 |
| packed index residual value | | predictor | | packed index value |
|---|---|---|---|---|
| 0 0 0 0 0 0 0 1 | ⊗ | 0 0 0 0 0 1 1 0 | = | 0 0 0 0 0 1 1 1 |
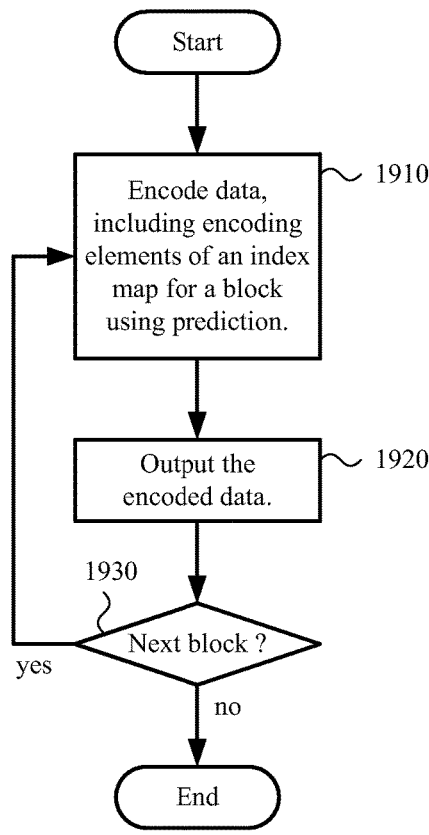
Figure 19  1900
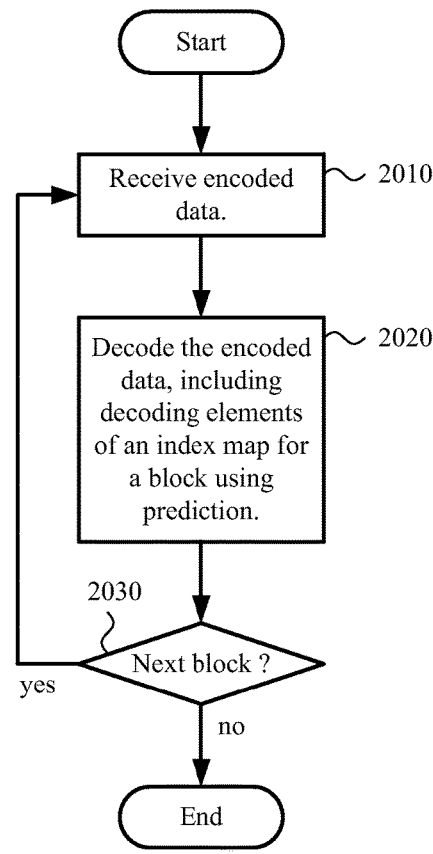
Figure 20  2000

Figure 21a  2100

```
200  200  179  168   41   41  127
 85  200  200  168  168   41   41  127
 85  200  200  168  168   41   41  127
 85  200  200  168  168   41   41  127
 85  200  200  168  168   41   41  127
 85  200  200  168  168   41   41  127
 85  200  200  168  168   41   41  127
 85  200  200  168  168   26   26  127
 85  200  200  168  168   26   26   29
``` block (2110) of sample values $s$ mapping sample values to
index values to packed index
values, with exception values
handled without index values

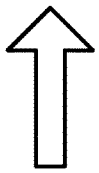

| packed index value: | base color |
|---|---|
| -2: | 85 |
| -1: | 41 |
| 0: | 200 |
| 1: | 168 |
| 2: | 127 |
| 3: | 26 | exception values: 179, 29

$e = (s/q) + h + 1$, where $h$ is 3 (depends on highest packed index value) and
$q$ is quantization parameter (e.g., 4)

```
 0   0   0  49   1   1  -1  -1   2
-2   0   0   0   1   1  -1  -1   2
-2   0   0   0   1   1  -1  -1   2
-2   0   0   0   1   1  -1  -1   2
-2   0   0   0   1   1  -1  -1   2
-2   0   0   0   1   1  -1  -1   2
-2   0   0   0   1   1  -1  -1   2
-2   0   0   0   1   1   3   3   2
-2   0   0   0   1   1   3   3  11
``` block (2130) of packed index values
$n_{packed}$ and exception values $e$

Figure 21b  2100 (cont.)

| 200 | 200 | 200 | 180 | 168 | 41 | 41 | 127 |
|-----|-----|-----|-----|-----|----|----|-----|
| 85 | 200 | 200 | 168 | 168 | 41 | 41 | 127 |
| 85 | 200 | 200 | 168 | 168 | 41 | 41 | 127 |
| 85 | 200 | 200 | 168 | 168 | 41 | 41 | 127 |
| 85 | 200 | 200 | 168 | 168 | 41 | 41 | 127 |
| 85 | 200 | 200 | 168 | 168 | 41 | 41 | 127 |
| 85 | 200 | 200 | 168 | 168 | 26 | 26 | 127 |
| 85 | 200 | 200 | 168 | 168 | 26 | 26 | 28 | block (2150) of reconstructed sample values $s$

⬆ mapping packed index values to index values to sample values, with exception values handled without index values

| 0 | 0 | 0 | 49 | 1 | 1 | −1 | 2 |
|---|---|---|---|---|---|---|---|
| −2 | 0 | 0 | 1 | 1 | 1 | −1 | 2 |
| −2 | 0 | 0 | 1 | 1 | 1 | −1 | 2 |
| −2 | 0 | 0 | 1 | 1 | 1 | −1 | 2 |
| −2 | 0 | 0 | 1 | 1 | 1 | −1 | 2 |
| −2 | 0 | 0 | 1 | 1 | 1 | −1 | 2 |
| −2 | 0 | 0 | 1 | 1 | 1 | 3 | 2 |
| −2 | 0 | 0 | 1 | 1 | 3 | 3 | 11 | block (2130) of packed index values $n_{packed}$ and exception values $e$ packed index value:   base color
- −2:  85
- −1:  41
- 0:  200
- 1:  168
- 2:  127
- 3:  26 exception values:  any $n_{packed} > 3$ $s'' = (e - h - 1) * q$, where $h$ is 3 (depends on highest packed index value) and $q$ is quantization parameter (e.g., 4)

FEATURES OF BASE COLOR INDEX MAP MODE FOR VIDEO AND IMAGE CODING AND DECODING

CROSS REFERENCE TO RELATED APPLICATIONS

This is a U.S. National Stage of International Application No. PCT/CN2013/085166, filed Oct. 14, 2013, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M standard. More recently, the HEVC standard (ITU-T H.265 or ISO/IEC 23008-2) has been approved. Extensions to the HEVC standard (e.g., for scalable video coding/decoding, for coding/decoding of video with higher fidelity in terms of sample bit depth or chroma sampling rate, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

In base color index map ("BCIM") mode, a video encoder encodes sample values using index values that represent base colors. Each of the index values is associated with a different value ("base color") among the sample values. For example, if an 8×8 block has four different values among the 64 sample values of the block, the encoder assigns four different index values for those four base colors. During encoding, the sample values are replaced with corresponding index values. The encoder encodes and signals a mapping of index values to base colors ("base color table") as well as data for the arrangement of index values representing the sample values ("index map"). A decoder receives and decodes the mapping of index values to base colors. Using that mapping, the decoder replaces index values in the index map with base colors for the original sample values.

BCIM mode can be helpful when encoding certain "artificially" created video content such as screen-capture content. Screen-capture content typically includes repeated structures (e.g., graphics, text characters) that use few distinct sample values, compared to natural video. This provides opportunities for BCIM to improve performance.

The current design of BCIM mode for the HEVC standard and implementation in some reference software for the HEVC standard has several problems. For example, BCIM requires many new syntax elements and syntax structures for the base color mapping and index map, which complicates implementation. Also, the approach to encoding/decoding the base color mapping and index map uses tools unlike those already included in the HEVC standard, again complicating implementation. Also, encoding of the base color table and index map is inefficient.

SUMMARY

In summary, the detailed description presents innovations in base color index map ("BCIM") mode. For example, some of the innovations relate to reusing a syntax structure for transform coefficients in non-BCIM mode and for elements of an index map in BCIM mode. This can reduce the number of modifications made to support BCIM mode. Other innovations relate to strategies for mapping of index values or prediction of elements of an index map, which can improve the coding efficiency of BCIM mode. Still other innovations relate to handling of exception values in BCIM mode.

The innovations for base color index map mode can be implemented as part of a method, as part of a computing device adapted to perform the method or as part of a tangible computer-readable media storing computer-executable instructions for causing a computing device to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 4 is a diagram of an example decoder system in conjunction with which some described embodiments can be implemented.

FIGS. 10 and 11 are flowcharts illustrating generalized techniques for encoding and decoding, respectively, that use a coefficient coding syntax structure selectively representing elements of an index map or transform coefficients.

FIG. 13 is chart illustrating mapping of index values to packed index values and mapping of packed index values back to index values.

FIGS. 16 and 17 are charts illustrating prediction of elements of an index map using subtraction operations during encoding and addition operations during decoding.

FIG. 18 is a chart illustrating prediction of an element of an index map using an XOR operation during encoding, and corresponding reconstruction of the element using an XOR operation during decoding.

FIGS. 19 and 20 are flowcharts illustrating generalized techniques for prediction of elements of an index map during encoding and decoding, respectively.

FIGS. 21a and 21b are charts illustrating processing of exception values and index values for BCIM mode during encoding and decoding, respectively.

DETAILED DESCRIPTION

The detailed description presents innovations in the use of base color index map ("BCIM") mode during encoding and/or decoding. In particular, the detailed description presents innovations for reusing a syntax structure that is adapted for transform coefficients to instead signal data for elements of an index map in BCIM mode, mapping of index values in BCIM mode, prediction of elements of an index map and handling of exception values in BCIM mode. Some of these innovations simplify implementation by reducing the number of modifications made to support BCIM mode. Other innovations improve coding efficiency of BCIM mode.

Although operations described herein are in places described as being performed by a video encoder or video decoder, in many cases the operations can be performed by another type of media processing tool (e.g., image encoder, image decoder).

Some of the innovations described herein are illustrated with reference to syntax elements and operations specific to the HEVC standard. For example, reference is made to the draft version JCTVC-N1005 of the HEVC standard—"High Efficiency Video Coding (HEVC) Range Extensions Text Specification: Draft 4," JCTVC-N1005, July 2013. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

Figure 1:
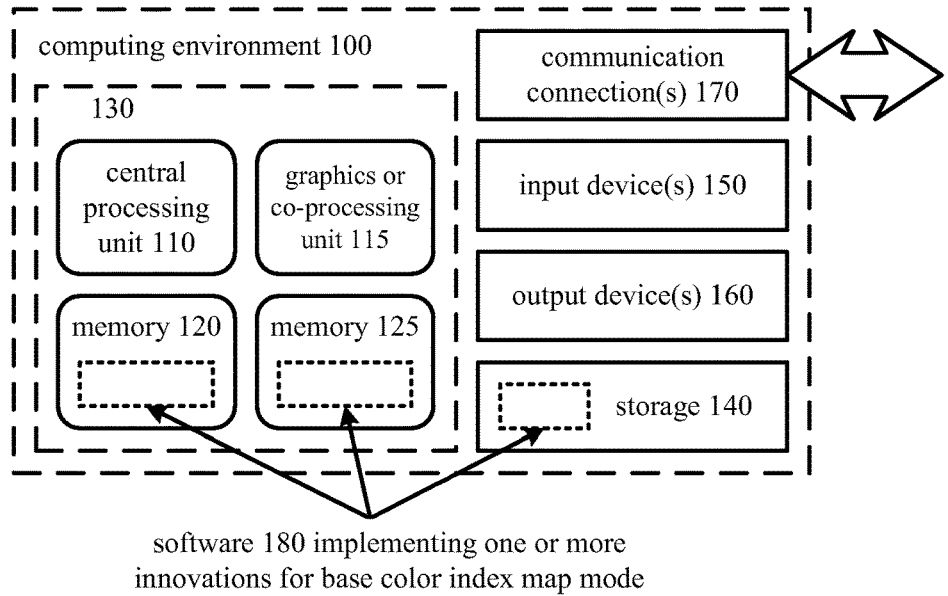
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for BCIM mode, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for BCIM mode.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
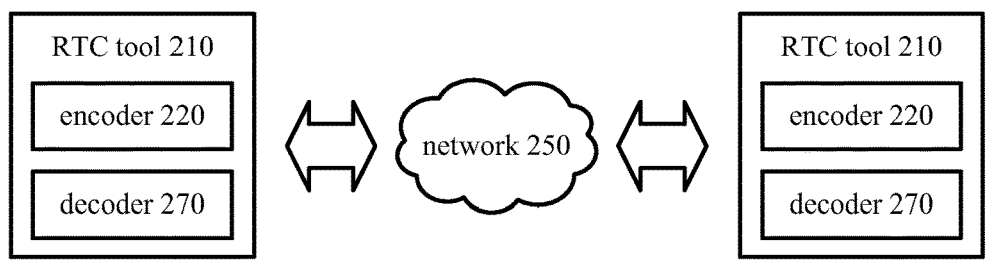
FIGS. 2a and 2b are diagrams of example network environments in which some described embodiments can be implemented.
Figure 2B:
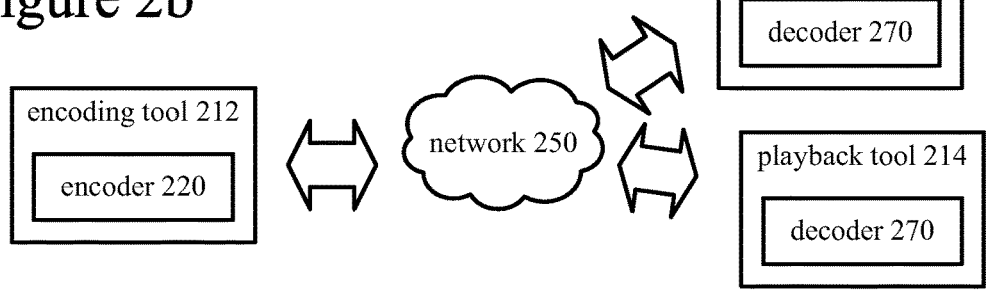

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 3:
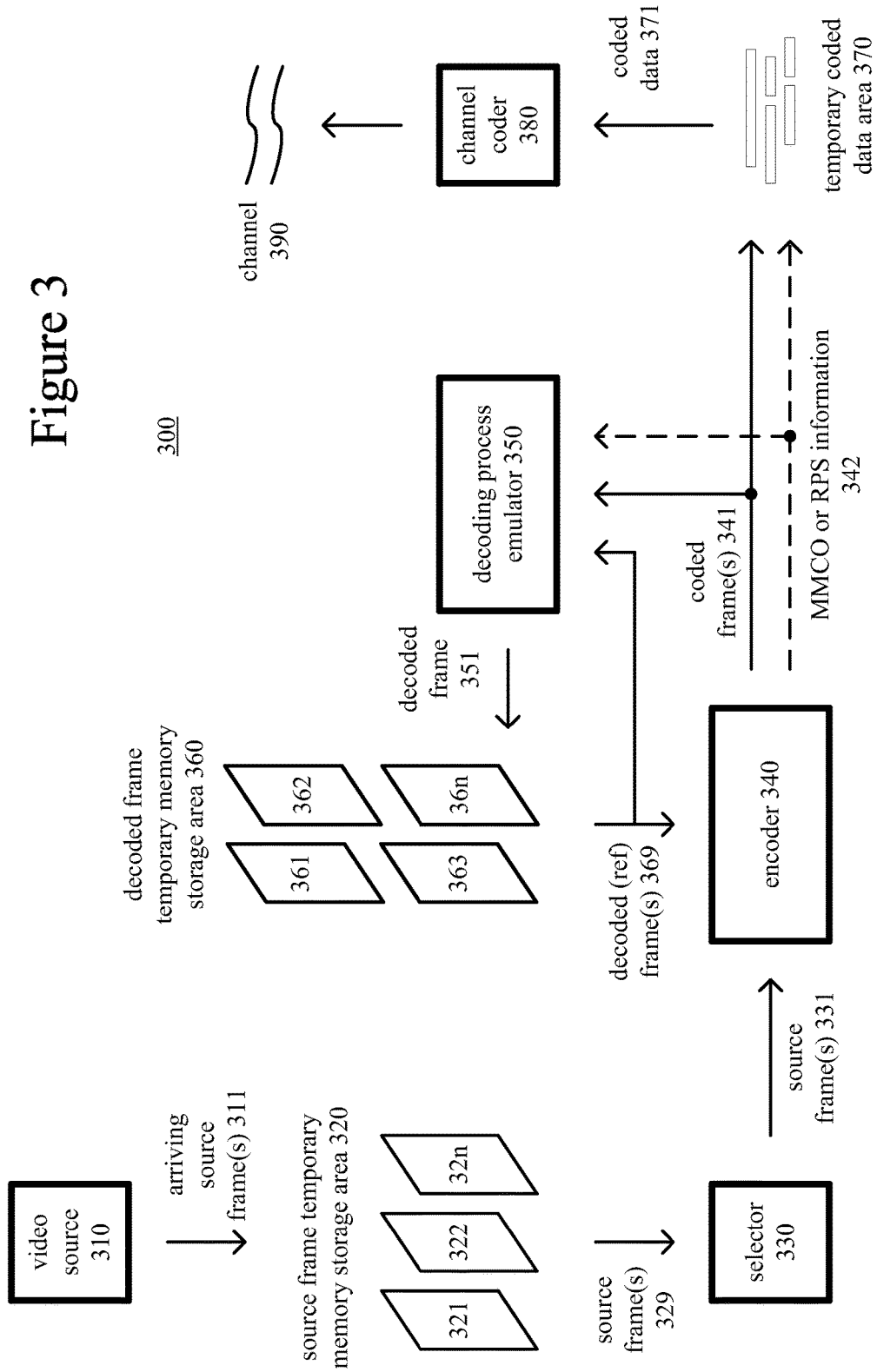
FIG. 3 is a diagram of an example encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using BCIM mode.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the selected frame (331) before encoding. The pre-processing can also include color space conversion into primary and secondary components for encoding. Typically, before encoding, video has been converted to a color space such as YUV, in which sample values of a luma (Y) component represent brightness or intensity values, and sample values of chroma (U, V) components represent color-difference values. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to improve options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. As used herein, the term "block" can indicate a CB, PB, TB or other set of sample values, depending on context. The encoder decides how to partition video into CTUs, CUs, PUs, TUs, etc.

Returning to FIG. 3, the encoder represents an intra-coded block of a source frame (331) in terms of prediction from other, previously reconstructed sample values in the frame (331). For intra spatial prediction for a block, the intra-picture estimator estimates extrapolation of the neighboring reconstructed sample values into the block. The intra-prediction estimator outputs prediction information (such as prediction mode (direction) for intra spatial prediction), which is entropy coded. An intra-prediction predictor applies the prediction information to determine intra prediction values. For BCIM mode, the encoder represents an intra-coded block with index values for base colors among the sample values of the block, using a base color table for the index values and using elements of an index map. The encoder can also represent exception values in the BCIM-mode block without using index values, as described below.

The encoder (340) represents an inter-coded, predicted block of a source frame (331) in terms of prediction from reference frames. A motion estimator estimates motion of the block with respect to one or more reference frames (369). When multiple reference frames are used, the multiple reference frames can be from different temporal directions or the same temporal direction. A motion-compensated prediction reference region is a region of samples in the reference frame(s) that are used to generate motion-compensated prediction values for a block of samples of a current frame. The motion estimator outputs motion information such as motion vector information, which is entropy coded. A motion compensator applies motion vectors to reference frames (369) to determine motion-compensated prediction values.

In non-BCIM modes, the encoder determines the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. In BCIM mode, the encoder skips the transform and quantization operations, except for certain quantization operations when handling exception values.

The entropy coder of the encoder (340) compresses quantized transform coefficient values as well as certain side information (e.g., motion vector information, QP values, mode decisions, parameter choices). In particular, the entropy coder can compress data for elements of an index map using a coefficient coding syntax structure. Typical entropy coding techniques include Exp-Golomb coding, arithmetic coding, differential coding, Huffman coding, run length coding, variable-length-to-variable-length ("V2V") coding, variable-length-to-fixed-length ("V2F") coding, LZ coding, dictionary coding, probability interval partitioning entropy coding ("PIPE"), and combinations of the above. The entropy coder can use different coding techniques for different kinds of information, and can choose from among multiple code tables within a particular coding technique.

The coded frames (341) and MMCO/RPS information (342) are processed by a decoding process emulator (350). The decoding process emulator (350) implements some of the functionality of a decoder, for example, decoding tasks to reconstruct reference frames. The decoding process emulator (350) uses the MMCO/RPS information (342) to determine whether a given coded frame (341) needs to be reconstructed and stored for use as a reference frame in inter-frame prediction of subsequent frames to be encoded. If the MMCO/RPS information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). The decoding process emulator (350) uses the MMCO/RPS information (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize the aggregated data for transmission as a media stream (e.g., according to a media stream multiplexing format such as ISO/IEC 13818-1), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output.

IV. Example Decoder Systems

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include content encoded using BCIM mode.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream (e.g., according to a media stream multiplexing format such as ISO/IEC 13818-1), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s).

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization, inverse frequency transforms, intra prediction, motion compensation and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra prediction module can spatially predict sample values of a current block from neighboring, previously reconstructed sample values. For BCIM mode, the decoder reconstructs an intra-coded block with index values for base colors among the sample values of the block, using a base color table for the index values and using elements of an index map.

In non-BCIM modes, the decoder (450) also reconstructs prediction residuals. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency domain data into spatial domain information. In BCIM mode, the decoder skips the inverse quantization and inverse frequency transform operations, except for certain inverse quantization operations when decoding exception values. For an inter-predicted block, the decoder (450) combines reconstructed prediction residuals with motion-compensated predictions. The decoder (450) can similarly combine prediction residuals with predictions from intra prediction. A motion compensation loop in the video decoder (450) includes an adaptive de-blocking filter to smooth discontinuities across block boundary rows and/or columns in the decoded frame (451).

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) uses the MMCO/RPS information (432) to identify when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders

Figure 5A:
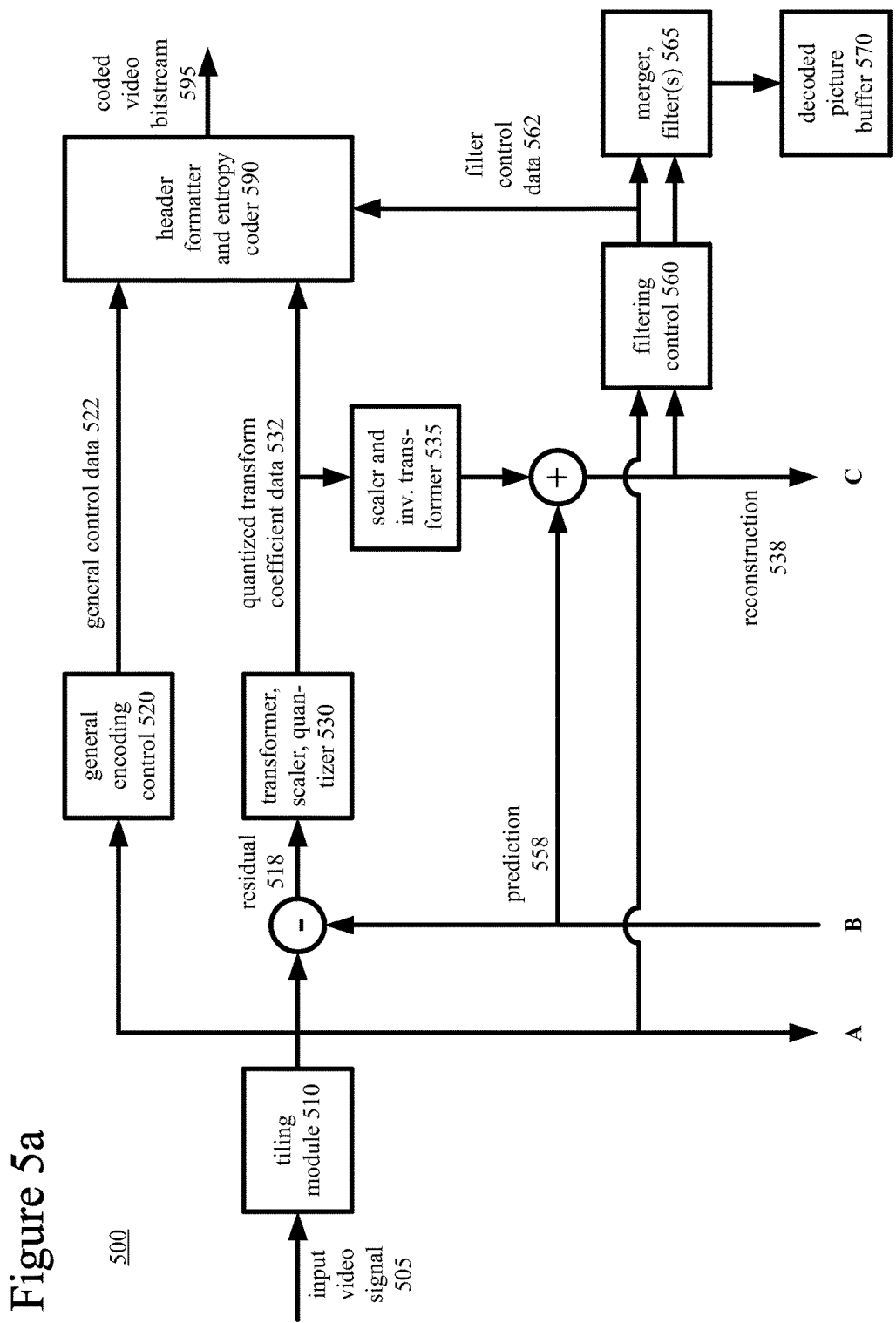
FIGS. 5a and 5b are diagrams illustrating an example video encoder in conjunction with which some described embodiments can be implemented.
Figure 5B:
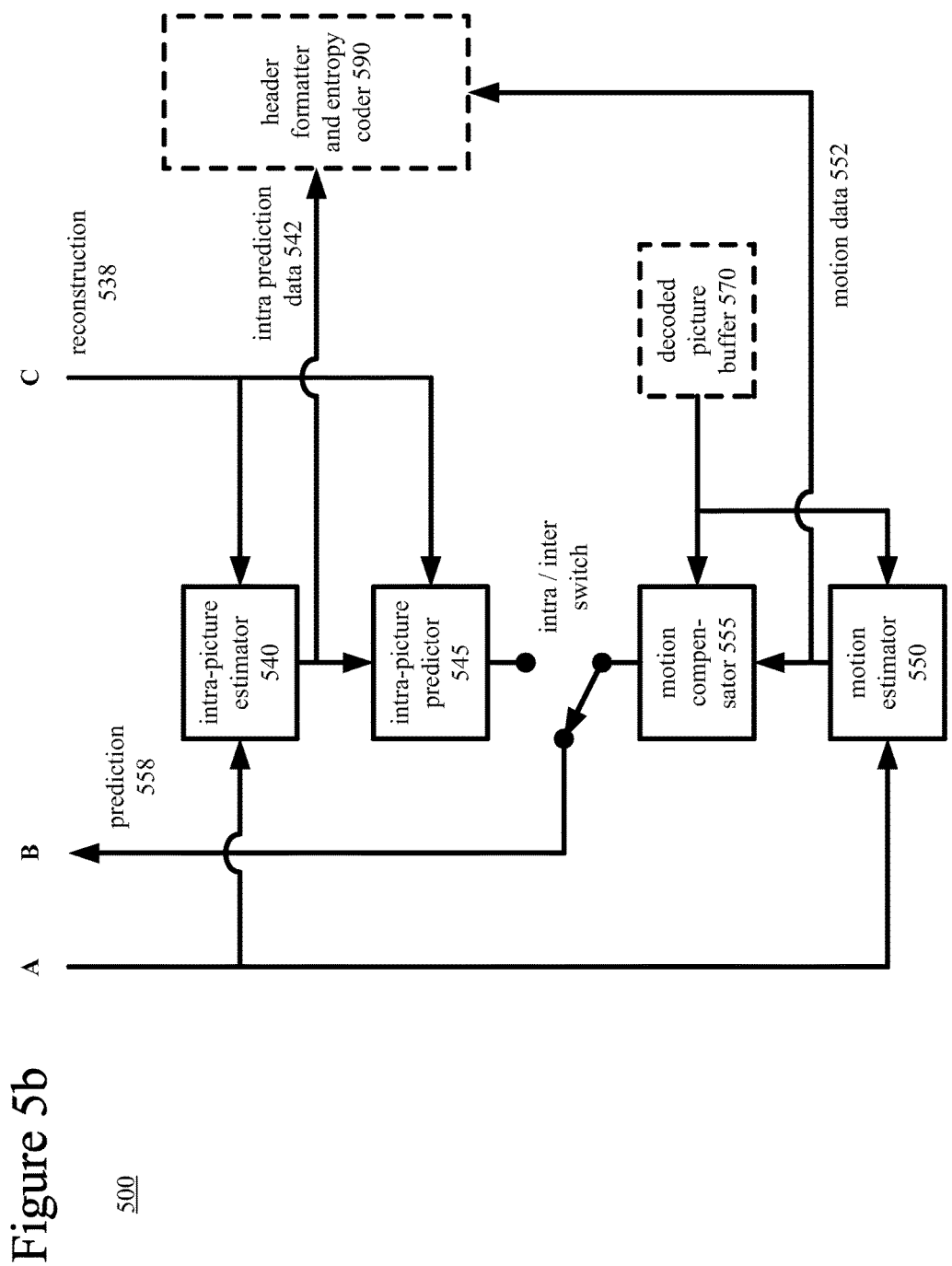

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. The tiling module (510) can then group the tiles into one or more tile sets, where a tile set is a group of one or more of the tiles.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use BCIM mode during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates motion of blocks of sample values of the current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as motion vector data and reference picture selection data. The motion data (552) is provided to the header formatter/entropy coder (590) as well as the motion compensator (555).

The motion compensator (555) applies motion vectors to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture. For BCIM mode, the encoder (500) represents an intra-coded block with index values for base colors among the sample values of the block, using an index map for the index values and using elements of an index map.

The intra-prediction estimator (540) produces as side information intra prediction data (542), such as information indicating whether intra prediction uses spatial prediction or BCIM mode (e.g., a flag value per intra block or per intra block of certain prediction mode directions), prediction mode direction (for intra spatial prediction). The intra prediction data (542) is provided to the header formatter/entropy coder (590) as well as the intra-picture predictor (545). According to the intra prediction data (542), the intra-picture predictor (545) spatially predicts sample values of a current block of the current picture from neighboring, previously reconstructed sample values of the current picture, or reconstructs sample values of BCM-mode blocks.

In non-BCM modes, the intra/inter switch selects values of a motion-compensated prediction or intra-picture prediction for use as the prediction (558) for a given block. In non-BCIM modes, the difference (if any) between a block of the prediction (558) and corresponding part of the original current picture of the input video signal (505) provides values of the residual (518). During reconstruction of the current picture, reconstructed residual values are combined with the prediction (558) to produce a reconstruction (538) of the original content from the video signal (505). In lossy compression, however, some information is still lost from the video signal (505).

In the transformer/scaler/quantizer (530), for non-BCIM modes, a frequency transformer converts spatial domain video information into frequency domain (i.e., spectral, transform) data. For block-based video coding, the frequency transformer applies a discrete cosine transform ("DCT"), an integer approximation thereof, or another type of forward block transform to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies non-uniform, scalar quantization to the frequency domain data with a step size that varies on a frame-by-frame basis, tile-by-tile basis, slice-by-slice basis, block-by-block basis or other basis. The quantized transform coefficient data (532) is provided to the header formatter/entropy coder (590).

In the scaler/inverse transformer (535), for non-BCIM modes, a scaler/inverse quantizer performs inverse scaling and inverse quantization on the quantized transform coefficients. An inverse frequency transformer performs an inverse frequency transform, producing blocks of reconstructed prediction residuals or sample values. The encoder (500) combines reconstructed residuals with values of the prediction (558) (e.g., motion-compensated prediction values, intra-picture prediction values) to form the reconstruction (538).

For intra-picture prediction, the values of the reconstruction (538) can be fed back to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and sample adaptive offset ("SAO") filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542) and packed index values, motion data (552) and filter control data (562). For example, the header formatter/entropy coder (590) uses context-adaptive binary arithmetic coding ("CABAC") for entropy coding of various syntax elements of a coefficient coding syntax structure.

The header formatter/entropy coder (590) provides the encoded data in the coded video bitstream (595). The format of the coded video bitstream (595) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders

Figure 6:
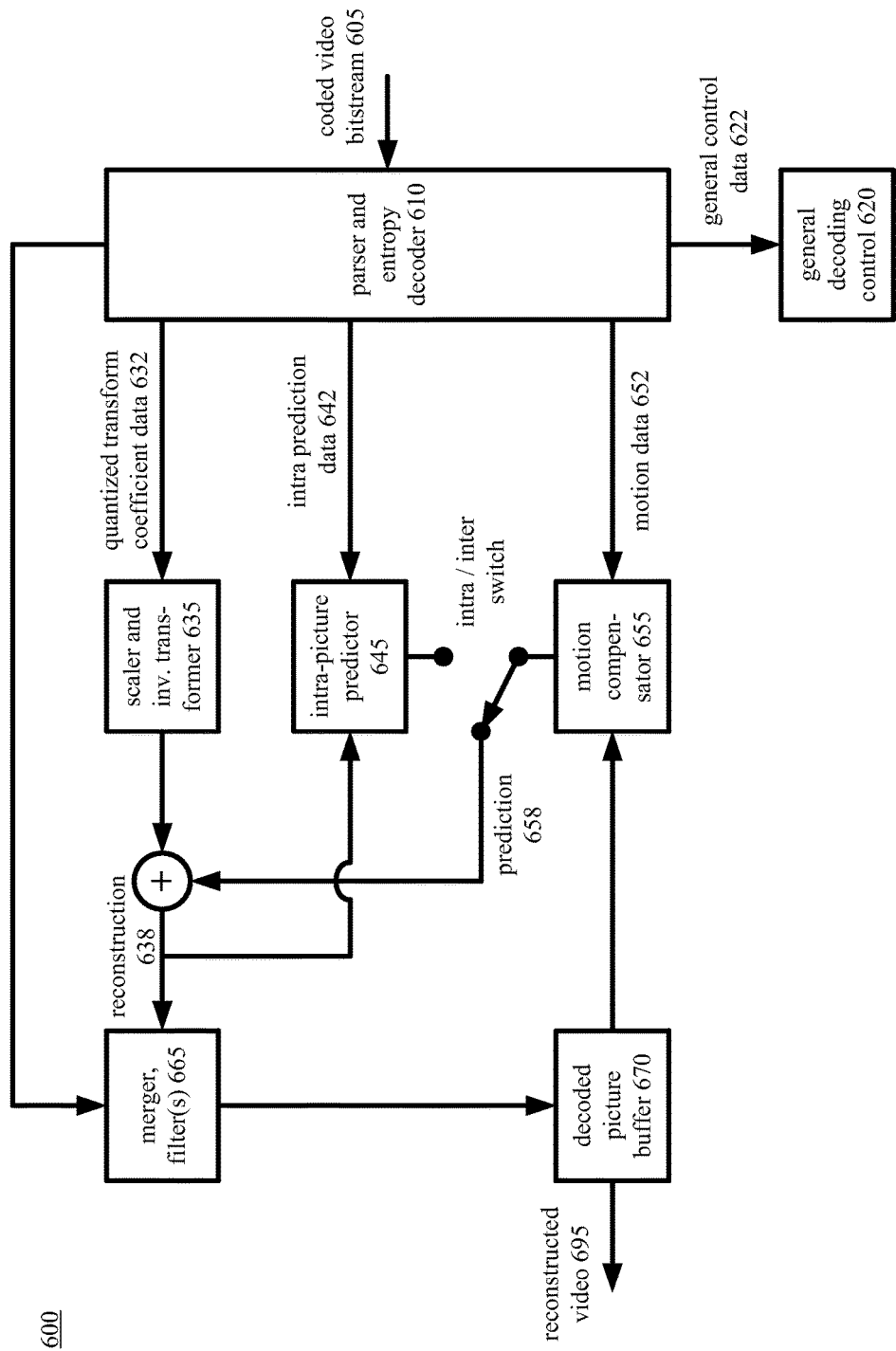
FIG. 6 is a diagram illustrating an example video decoder in conjunction with which some described embodiments can be implemented.

FIG. 6 is a block diagram of a generalized decoder (600) in conjunction with which several described embodiments may be implemented. The decoder (600) receives encoded data in a coded video bitstream (605) and produces output including pictures for reconstructed video (695). The format of the coded video bitstream (605) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). For example, the parser/entropy decoder (610) uses context-adaptive binary arithmetic decoding for entropy decoding of various syntax elements of a coefficient coding syntax structure. As a result of parsing and entropy decoding, the parser/entropy decoder (610) produces general control data (622), quantized transform coefficient data (632), intra prediction data (642) and packed index values, motion data (652) and filter control data (662).

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as motion vector data and reference picture selection data. The motion compensator (655) applies motion vectors to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-prediction predictor (645) receives the intra prediction data (642), such as information indicating whether intra prediction uses spatial prediction or BCIM mode (e.g., a flag value per intra block or per intra block of certain prediction mode directions), prediction mode direction (for intra spatial prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. For BCIM mode, the decoder reconstructs an intra-coded block with index values for base colors among the sample values of the block, using a base color table for the index values and using elements of an index map.

In non-BCIM modes, the intra/inter switch selects values of a motion-compensated prediction or intra-picture prediction for use as the prediction (658) for a given block. For example, when HEVC syntax is followed, the intra/inter switch can be controlled based on a syntax element encoded for a CU of a picture that can contain intra-predicted CUs and inter-predicted CUs. The decoder (600) combines the prediction (658) with reconstructed residual values to produce the reconstruction (638) of the content from the video signal.

To reconstruct the residual, for non-BCIM modes, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residuals or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform.

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing deblock filter. The post-processing deblock filter optionally smoothes discontinuities in reconstructed pictures. Other filtering (such as de-ring filtering) can also be applied as part of the post-processing filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Innovations for Base Color Index Map Mode

This section presents various innovations for base color index map ("BCIM") mode. Some of the innovations relate to reuse of a coefficient coding syntax structure for either transform coefficients or index map data in BCIM mode, while others relate to mapping or prediction of index values in BCIM mode. Still others relate to handling of exception values in BCIM mode. These innovations can facilitate BCIM mode that is more effective in terms of rate-distortion performance and/or computational efficiency of encoding and decoding. In particular, using BCIM mode can improve rate-distortion performance when encoding certain "artificially" created video content such as screen-capture content. Screen-capture content typically includes repeated structures (e.g., graphics, text characters), which provide opportunities for intra BC prediction to improve performance. Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0).

A. Base Color Index Map Mode—Introduction.

In BCIM mode, a video encoder or image encoder encodes sample values using index values that represent base colors. Each of the index values is associated with a different value ("base color") among the sample values. During encoding, the sample values are replaced with corresponding index values. The encoder encodes and signals a table of index values and corresponding base colors ("base color table") as well as the arrangement of index values that represent the sample values ("index map"). A video decoder or image decoder receives and decodes the table of index values and corresponding base colors. Using that base color table, the decoder replaces index values of the index map with base colors for the original sample values.

Figure 7:
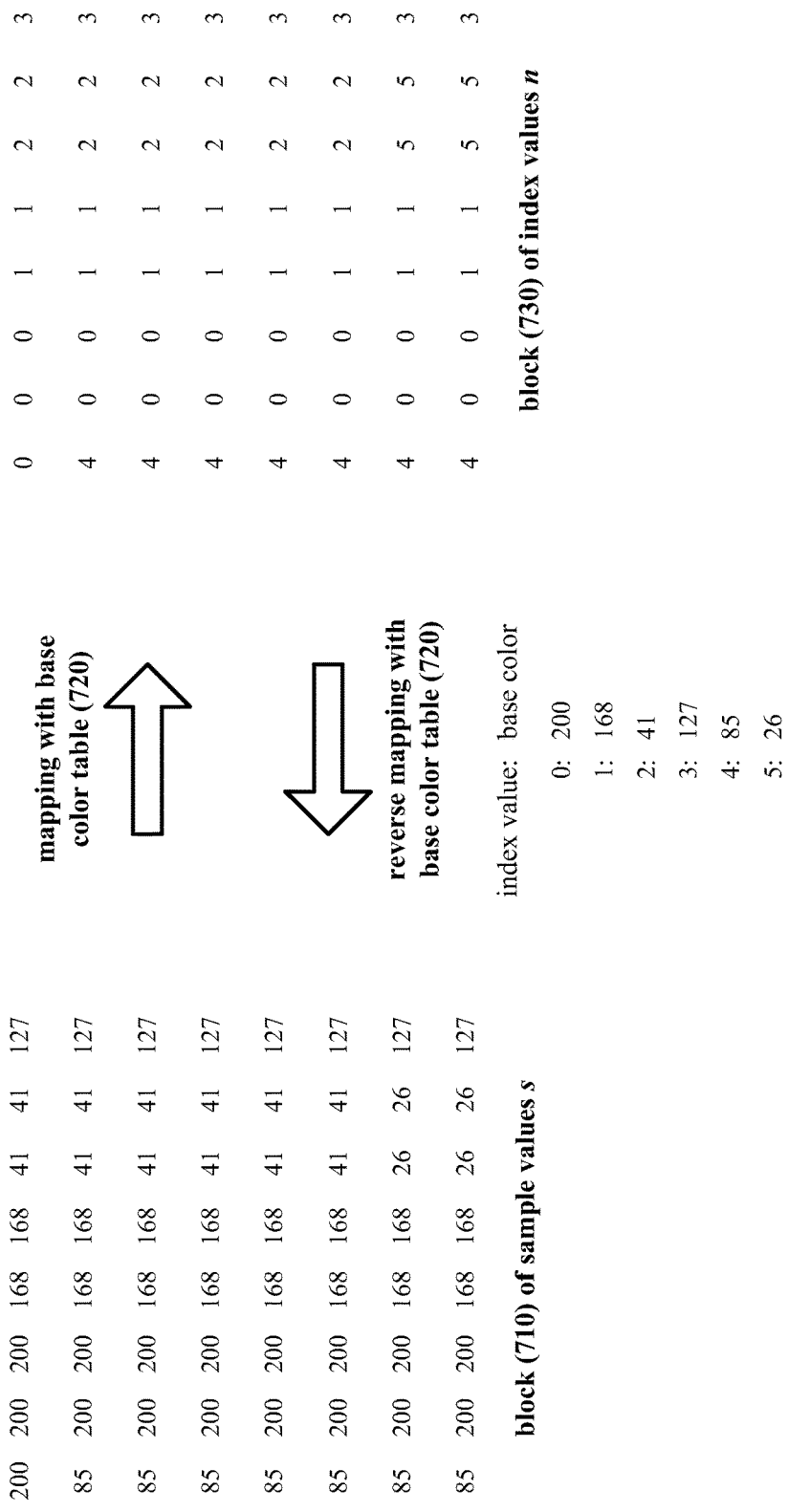
FIG. 7 is chart illustrating base color index map mode for a block of a picture.

FIG. 7 shows a block (710) of sample values s in a two-dimensional arrangement with dimensions i, j, for $0 \leq i \leq 7$ and $0 \leq j \leq 7$. In FIG. 7, the sample values s represent intensity or brightness values for screen capture content. The sample values s include sections of uniform values and strong patterns. The block (710) includes sample values 26, 85, 41, 127, 168 and 200.

The encoder creates a base color table (720) that assigns index values to corresponding base colors. In the example of FIG. 7, the index value 0 is assigned to the sample value 200, the index value 1 is assigned to the sample value 168, and so on. The encoder can assign index values to base colors according to their likelihood of occurrence in the picture, such that more common sample values have lower index values and less common sample values have higher index values, which tends to result in more efficient coding if lower index values are represented with fewer bits. Alternatively, the encoder can assign index values to base colors according to order of appearance as a block is scanned, relying on later processes such as prediction to exploit redundancy among the index values of the index map. The base color table (720) can be implemented as a look-up table or other data structure.

FIG. 7 shows a block (730) in which sample values s are replaced with corresponding index values n. The process of replacing sample values with index values is lossless. Alternatively, in a lossy compression variation, a sample value can be replaced with the index value representing the base color closest to the sample value, if an exact match is not available. This can reduce the size of the base color table (720) but also introduce perceptible distortion. Another approach to handling sample values not represented with index values (so-called exception values) is described below.

The encoder encodes and outputs the base color table (720) as well as an index map with elements representing the block (730) of index values n. For example, the encoder uses a coefficient coding syntax structure to represent elements of the block (730), as described below. As part of the encoding, the index values n for the block (730) can be processed with further mapping operations and/or prediction.

During decoding, the decoder receives and decodes the base color table (720) and data for the index map. For example, the decoder decodes elements of the block (730) from a coefficient coding syntax structure, as described below. As part of the decoding, the index values n for the block (730) can be processed with further mapping operations and/or prediction. The decoder then reverses the mapping process using the base color table (720), as illustrated in FIG. 7.

In the example of FIG. 7, the encoder creates a base color table (720) for the sample values of an 8×8 block. Alternatively, the block has another size (e.g., 4×4, 16×16, 32×32 or 64×64). More generally, the block is an m×n block, where m and n can have an equal value or have different values. Or, the encoder can create a base color mapping for the sample values of a slice, a tile, an entire picture, a group of pictures, or a video sequence.

B. Reusing a Coefficient Coding Syntax Structure.

In some example implementations, a video encoder or image encoder uses a syntax structure normally used to signal transform coefficient information to instead signal BCIM mode data. In particular, the encoder reuses a coefficient coding syntax structure to signal index map information in BCIM mode.

Figure 8:
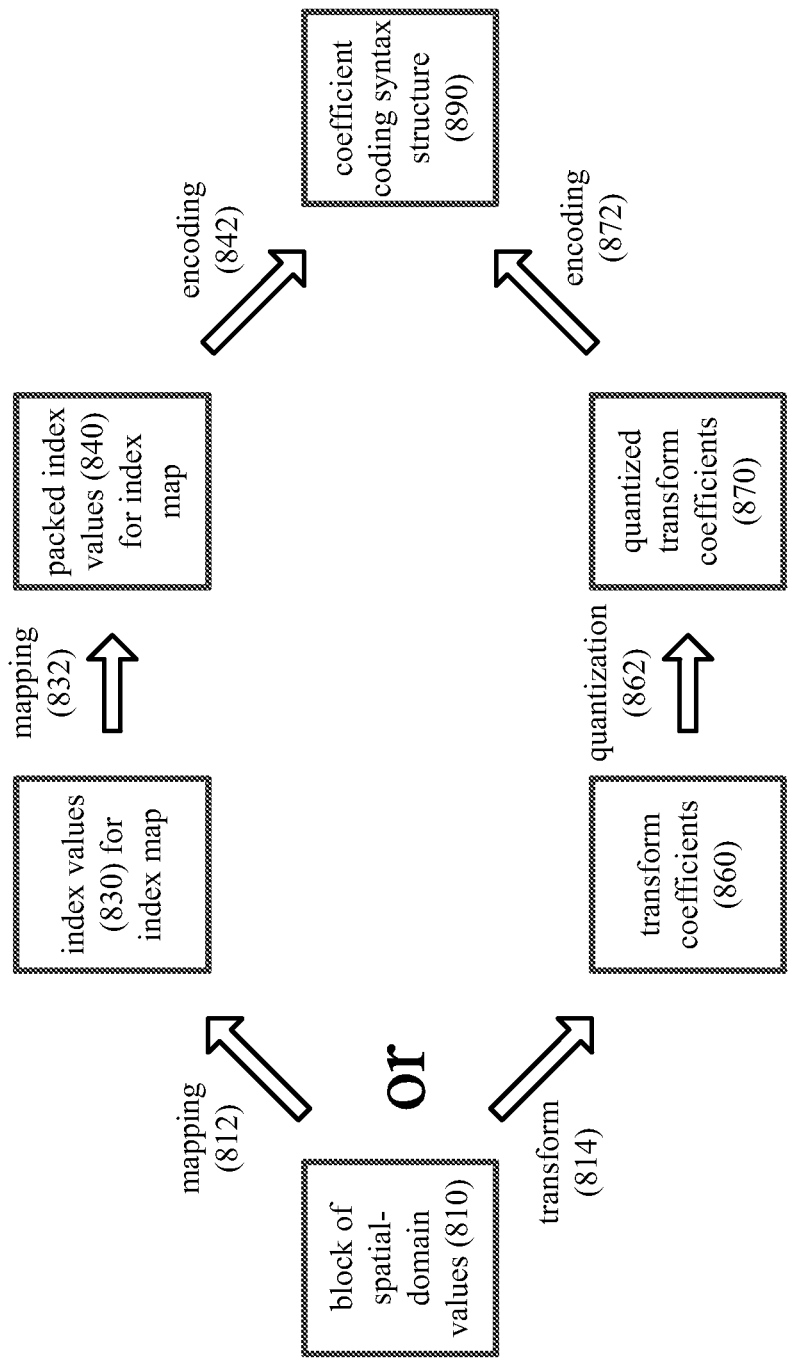
FIGS. 8 and 9 are diagrams illustrating example process flow during encoding and decoding, respectively, when the same coefficient coding syntax structure can be used to signal elements of an index map or transform coefficients.

FIG. 8 shows the process flow (800) of this approach during encoding. The encoder receives a block of spatial-domain values (810). The spatial-domain values (810) can be sample values. Or, the spatial-domain values (810) can be prediction residuals after inter-picture prediction or intra-picture prediction. The encoder can apply encoding operations in BCIM mode or apply operations in non-BCIM mode, using the same coefficient coding syntax structure in both modes.

For BCIM mode, the encoder maps (812) the spatial-domain values (810) (e.g., sample values) to index values (830), replacing spatial-domain values (810) with corresponding index values (830). The encoder further maps (832) the index values to packed index values (840) for an index map, for example, as described in the next section. The mapping operations (812, 832) in the BCIM mode do not include quantization or transform operations (except for encoding of exception values, in some implementations). The encoder encodes (842) a base color table and elements of the index map, using a coefficient coding syntax structure (890) to signal the packed index values (840) of the index map.

For non-BCIM mode, the encoder applies (814) a frequency transform to the spatial-domain values (810) (e.g., residual values), producing transform coefficients (860), which the encoder quantizes (862). Alternatively, the transform and/or quantization are skipped. The quantized transform coefficients (870) are then encoded using the coefficient coding syntax structure (890).

In some example implementations that follow HEVC syntax, the coefficient coding syntax structure is a residual_coding syntax structure. See, e.g., sections 7.3.8.11 and 7.4.9.11 of JCTVC-N1005. In the BCIM mode, the encoder processes the elements of the index map (e.g., index values, packed index values, index residual values, or packed index residual values, as described below) as if they were quantized transform coefficients. Specifically, the encoder signals the position of a last non-zero coefficient in the block, which can be a 4×4 block, 8×8 block, 16×16 block or 32×32 block. For each 4×4 group of values in the block, the encoder signals a flag indicating whether the 4×4 group has at least one non-zero coefficient. For a 4×4 group that has at least one non-zero coefficient, the encoder signals flags indicating which coefficients have non-zero values, then signals level information and (in most cases) sign information for the coefficients with non-zero values. The encoder uses CABAC to encode various elements of the residual_coding syntax structure. Alternatively, another coefficient coding syntax structure is used. For example, a coefficient coding syntax structure that follows syntax of the H.264 standard, VC-1 standard or another standard or proprietary format can be used.

Figure 9:
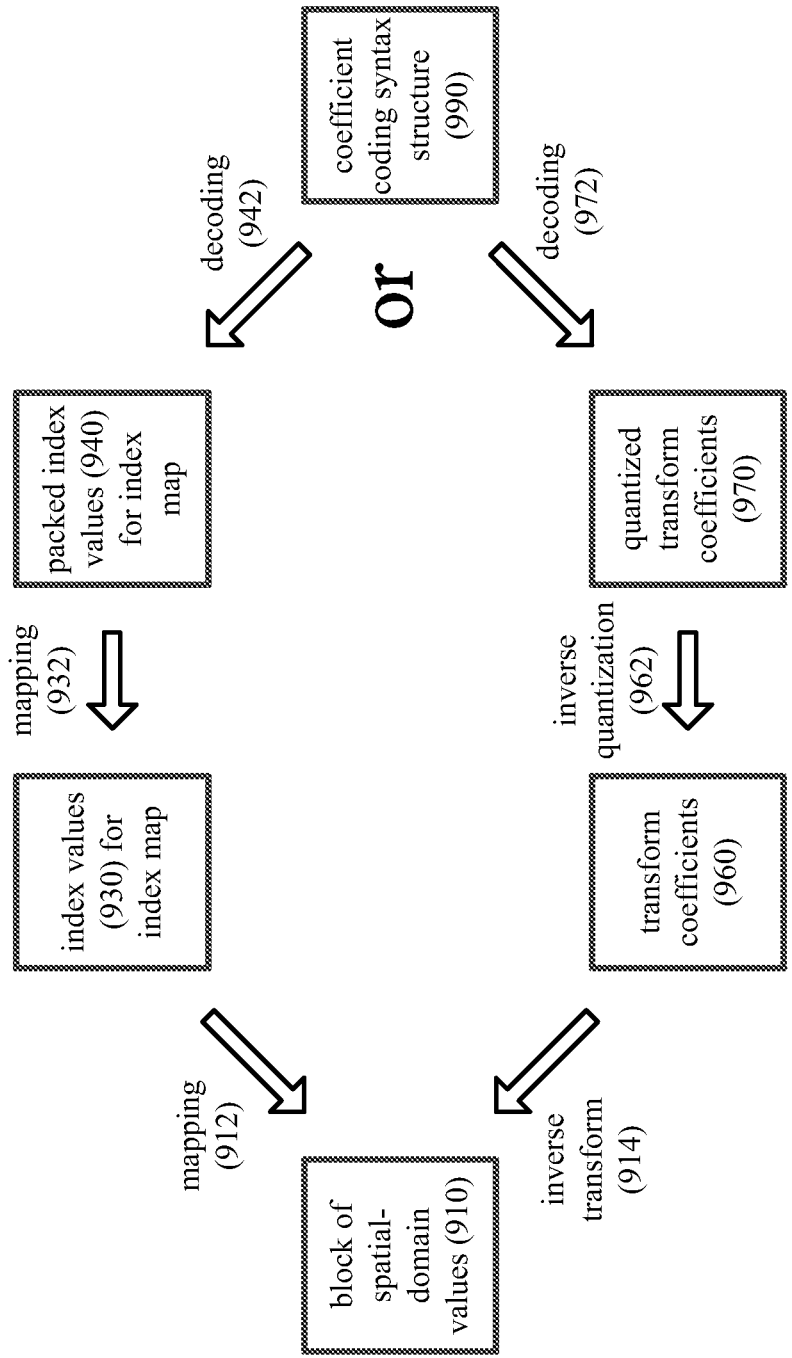

FIG. 9 shows the process flow (900) of this approach during decoding. The decoder receives a coefficient coding syntax structure (990). The decoder can apply operations in BCIM mode or apply operations in non-BCIM mode, using the same coefficient coding syntax structure in both modes.

For BCIM mode, the decoder decodes (942) a base color table and, using the coefficient coding syntax structure (990), also decodes (942) elements of an index map. This produces packed index values (940) for the index map. The decoder maps (932) packed index values (940) to index values (930) for the index map, for example, as described in the next section. The encoder then maps (912) the index values (930) to spatial-domain values (910) (e.g., sample values) for a block. The mapping operations (912, 932) in the BCIM mode do not include inverse quantization or inverse transform operations (except for decoding of exception values, in some implementations).

For non-BCIM mode, the decoder decodes (972) quantized transform coefficients (970) that have been signaled using the coefficient coding syntax structure (990). The decoder can inverse quantize (962) the quantized transform coefficients, then apply (914) an inverse frequency transform to reconstruct spatial-domain values (910) (e.g., prediction residuals). Alternatively, the inverse quantization and/or inverse transform are skipped. The decoder can then perform inter-picture prediction or intra-picture prediction (not shown) and combine reconstructed residual values with the predicted values (not shown).

FIG. 10 illustrates a generalized technique (1000) for encoding that uses a coefficient coding syntax structure to selectively represent elements of an index map or transform coefficients. The technique (1000) can be performed by an encoder as described with reference to FIG. 3 or FIGS. 5a and 5b, or by another encoder.

The encoder encodes (1010) data, using a coefficient coding syntax structure for a block to selectively represent elements of an index map for the block or transform coefficients for the block. For example, if the coefficient coding structure is used for transform coefficients in a non-BCIM mode, the encoder (a) computes residual values for the block, (b) performs a frequency transform on the residual values to produce the transform coefficients, (c) quantizes the transform coefficients, and (d) encodes the resulting values in the coefficient coding syntax structure. Or, if the coefficient coding structure is used for an index map in a BCIM mode, the encoder (a) maps sample values for the block to index values, each of the index values representing a base color, (b) maps the index values to packed index values or packed index residual values, and (c) encodes the resulting values in the coefficient coding syntax structure.

For the BCIM mode, the index map can include packed index values for the block, where each of the packed index values is an index value that represents a base color and is packed into the coefficient coding syntax structure. Or, the index map can include packed index residual values for the block, wherein each of the packed index residual values represents a base color and is packed into the coefficient coding syntax structure. A packed index residual value can be an index residual value based on the difference between an index value and a predicted index value, or the packed index residual value can be based on the difference between a packed index value and a predicted packed index value. The index map can also include one or more exception values not representing any base color, which can be processed as described below.

The encoder outputs (1020) the encoded data. For example, for implementations that follow HEVC syntax, the encoded data can include a residual_coding syntax structure for elements of the index map or transform coefficients. Alternatively, the encoded data is formatted in some other way. The encoder can repeat the technique (1000) for another block.

FIG. 11 illustrates a generalized technique (1100) for decoding that uses a coefficient coding syntax structure that selectively represents elements of an index map or transform coefficients. The technique (1100) can be performed by a decoder as described with reference to FIG. 4 or FIG. 6, or by another decoder.

The decoder receives (1110) encoded data. For example, for implementations that follow HEVC syntax, the encoded data can include a residual_coding syntax structure for elements of the index map or transform coefficients. Alternatively, the encoded data is formatted in some other way.

The decoder decodes (1120) the encoded data, using a coefficient coding syntax structure for a block that selectively represents elements of an index map for the block or transform coefficients for the block. For example, if the coefficient coding structure is used for transform coefficients in a non-BCIM mode, the decoder (a) decodes values for transform coefficients from the coefficient coding syntax structure, (b) inverse quantizes the transform coefficients, (c) performs an inverse frequency transform on the transform coefficients to produce residual values for the block, and (d) combines the residual values with prediction values to reconstruct sample values for the block. Or, if the coefficient coding structure is used for an index map in a BCIM mode, the decoder (a) decodes values for an index map from the coefficient coding syntax structure, (b) maps packed index values or packed index residual values to index values, each of the index values representing a base color, and (c) maps the index values to sample values for the block.

For the BCIM mode, the index map can include packed index values for the block, where each of the packed index values is an index value that represents a base color and is packed into the coefficient coding syntax structure. Or, the index map can include packed index residual values for the block, wherein each of the packed index residual values represents a base color and is packed into the coefficient coding syntax structure. A packed index residual value can be an index residual value based on the difference between an index value and a predicted index value, or the packed index residual value can be based on the difference between a packed index value and a predicted packed index value. The index map can also include one or more exception values not representing any base color, which can be processed as described below.

The decoder can repeat the technique (1100) for another block.

Figure 12:
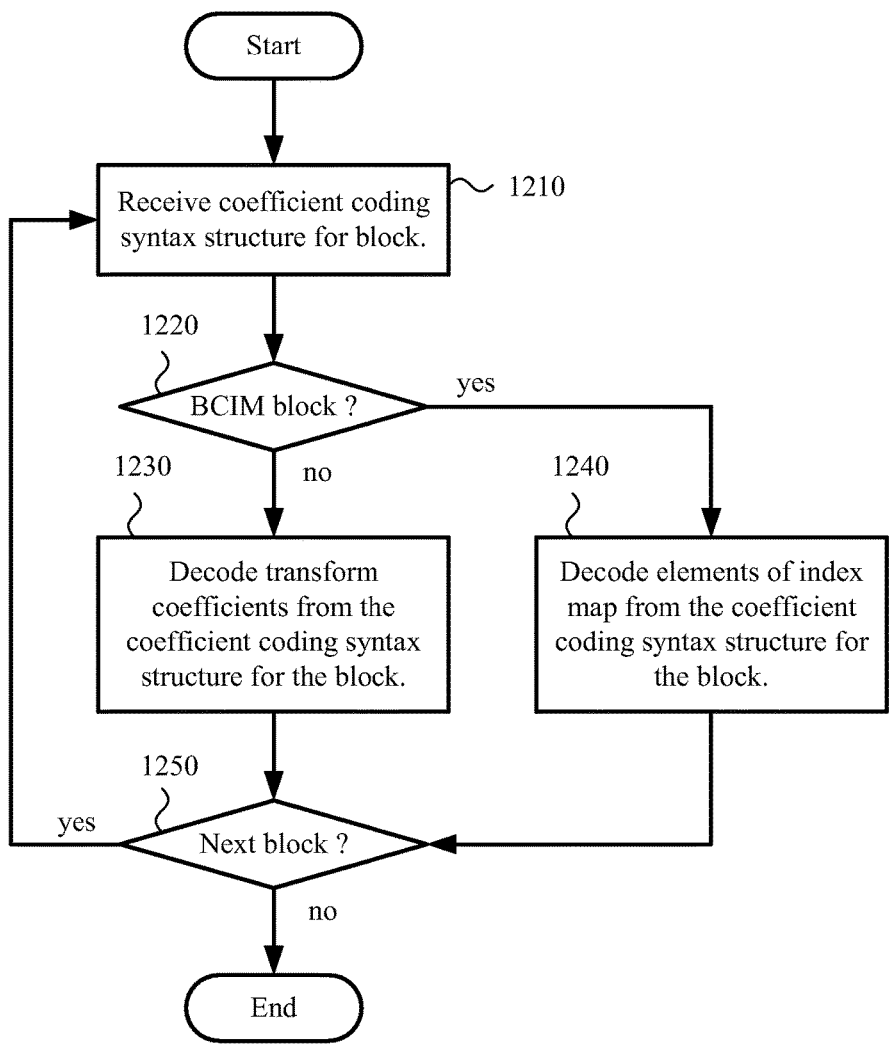
FIG. 12 is a flowchart of an example technique for decoding that uses a coefficient coding syntax structure that selectively represents elements of an index map or transform coefficients.

FIG. 12 illustrates a more specific example technique (1200) for decoding that uses a coefficient coding syntax structure that selectively represents elements of an index map or transform coefficients. The technique (1200) can be performed by a decoder as described with reference to FIG. 4 or FIG. 6, or by another decoder.

The decoder receives (1210) a coefficient coding syntax structure for a block. For example, for implementations that follow HEVC syntax, the coefficient coding syntax structure is a residual_coding syntax structure. Alternatively, the coefficient coding syntax structure is organized in some other way.

The decoder checks (1220) whether the mode of the block is BCIM. For example, the decoder checks the value of one or more syntax elements for the block. For implementations that follow HEVC syntax, the syntax element(s) that indicate whether the block is a BCIM-mode block can be signaled for a PU. Alternatively, the syntax element(s) are signaled for a CU, CB, PB, TU or TB.

If the block is a BCIM block, the decoder decodes (1240) elements of an index map from the coefficient coding structure for the block. Otherwise, the decoder decodes (1230) transform coefficients from the coefficient coding syntax structure for the block. For example, the decoder performs operations as described with reference to FIG. 9 or 11.

The decoder checks (1250) whether to continue with the next block. If so, the decoder receives (1210) the coefficient coding syntax structure for the next block.

C. Mapping Index Values to Packed Index Values.

To signal index values as if they were transform coefficients, an encoder maps the index values n to packed index values $n_{packed}$. During decoding, a decoder maps packed index values $n_{packed}$ back to index values n. The encoder and decoder can follow various strategies when mapping between index values n and packed index values $n_{packed}$.

For example, the encoder can simply use an index value as the packed index value. That is, $n_{packed}=n$ during encoding, and $n=n_{packed}$ during decoding. Aside from its simplicity, one advantage of this approach is that sign values for the packed index values $n_{packed}$ can be omitted from signaled encoded data, since the packed index values are always non-negative.

As a second example approach, the encoder can map an index value n to a packed index value $n_{packed}$ as follows.

if $n$ % 2 is 0 then $n_{packed}=-(n/2)$; and otherwise, $n_{packed}=(n+1)/2$.

where % represents a MOD operator such that x % y is the remainder when x is divided by y, and / represents division with truncation of the result towards zero. The decoder can map the packed index value $n_{packed}$ back to the index value n as follows.

if $n_{packed}$ is ≤0, $n=-2*n_{packed}$; and otherwise, $n=2*n_{packed}-1$.

FIG. 13 shows mapping of index values to packed index values, and mapping of packed index values back to index values, according to this approach. Index values n in a block (1310) are mapped to packed index values $n_{packed}$ in a block (1330) during encoding, and mapped backed to index values n in the block (1310) during decoding. The index values ranging from 0 . . . 5 are mapped to packed index values ranging from −2 . . . 3, and vice versa.

In a variation of the second example approach, the encoder can map even index values to non-negative numbers, and map odd numbers to negative values, with the decoder reversing that mapping. For the mapping during encoding:

if $n$ % 2 is 0 then $n_{packed}=(n/2)$; and otherwise, $n_{packed}=-(n+1)/2$.

In decoding:

if $n_{packed}$ is ≥0, $n=2*n_{packed}$; and otherwise, $n=-2*n_{packed}-1$.

As a third example approach, index values for different color components (e.g., luma and chroma components for video in YUV 4:4:4 format) can be mapped into a single packed index value for a pixel. For example, a luma sample is mapped to a luma index value $n_y$, and two corresponding chroma samples are mapped to two chroma index values $n_u$ and $n_v$. The index values $n_y$, $n_u$ and $n_v$ are then mapped to a single packed index value. If the number of bits used to represent each of the index values $n_y$, $n_u$ and $n_v$ is $n_{bits}$, the single packed index value $n_{packed,\ combined}$ (having $3*n_{bits}$ bits) can be determined as follows.

$n_{packed,combined}=n_y<<(2*n_{bits})+n_u<<n_{bits}+n_v$.

where << represents a left bit shift operation. For decoding, the index values $n_y$, $n_u$ and $n_v$ can be reconstructed using bit mask operations and bit shifting operations to identify the values of the appropriate bits of the packed index value $n_{packed,\ combined}$, as follows.

$n_y=n_{packed,combined}>>(2*n_{bits})$ $n_u=(n_{packed,combined}>>n_{bits})\&((1<<n_{bits})-1)$ $n_v=n_{packed,combined}\&((1<<n_{bits})-1)$ where >> represents a right bit shift operation, and & represents a bitwise AND operation. The ordering of index values $n_y$, $n_u$ and $n_v$ can be varied in the mapping operation during encoding, with corresponding changes to the mapping operations during decoding. Also, the index values $n_y$, $n_u$ and $n_v$ can have different numbers of bits, with corresponding changes to the mapping operations during encoding and decoding.

Alternatively, if there are $count_y$ base colors for the Y component, $count_u$ base colors for the U component, and $count_v$ base colors for the V component, the single packed index value can be determined as follows.

$n_{packed,combined}=n_v*(count_y*count_u)+n_u*count_y+n_y$.

For decoding, the index values $n_y$, $n_u$ and $n_v$ can be reconstructed as follows.

$n_y=n_{packed,combined}\%\ count_y$ $n_u=(n_{packed,combined}/count_y)\%\ count_u$ $n_v=n_{packed,combined}/(count_y*count_u)$ where / represent division with truncation of the result towards zero. Again, the ordering of index values $n_y$, $n_u$ and $n_v$ can be varied, with corresponding changes to which count variables are used.

Alternatively, the encoder and decoder use a different approach when mapping between index values n and packed index values $n_{packed}$.

Figure 14:
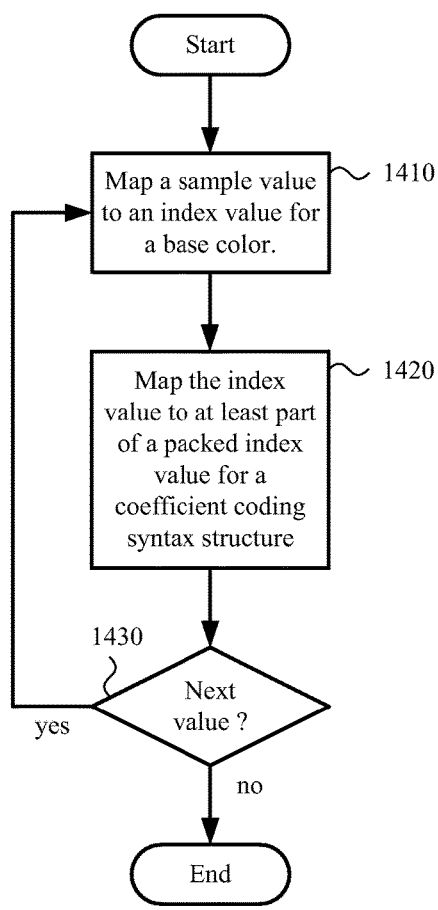
FIGS. 14 and 15 are flowcharts illustrating generalized techniques for mapping of index values for base colors during encoding and decoding, respectively.

FIG. 14 illustrates a technique (1400) for mapping of index values for base colors during encoding. The technique (1400) can be performed by an encoder as described with reference to FIG. 3 or FIGS. 5a and 5b, or by another encoder.

The encoder maps (1410) a sample value to an index value for a base color. For example, the encoder uses a base color table as described above to map a luma or chroma sample value to an index value.

The encoder then maps (1420) the index value to at least part of a packed index value for a coefficient coding syntax structure. For example, the encoder sets the packed index value based on the index value, e.g., as in the first mapping approach described above. Or, as another example, if the index value is even, the encoder sets the packed index value based on the index value divided by two, but otherwise the encoder sets the packed index value based on the index value plus one, then divided by two (e.g., as in the second mapping approach described above). Or, as another example, the encoder sets part of the packed index value using the index value, e.g., as in the third mapping approach described above, where the packed index values is set based on a luma index value and multiple chroma index values.

The encoder can then determine a packed index residual value based on the packed index value and a predicted packed index value, as described below. Or, the index values that are mapped to packed index residual values can be index residual values.

The encoder checks (1430) whether to continue with the next sample value. If so, the encoder maps (1410) the next sample values to the next index value. The encoder can proceed in a raster scan pattern through the sample values of a block. Or, for the third approach, the encoder can map sample values of corresponding positions in a luma block and chroma blocks to index values, then map those index values to a packed index value.

Figure 15:
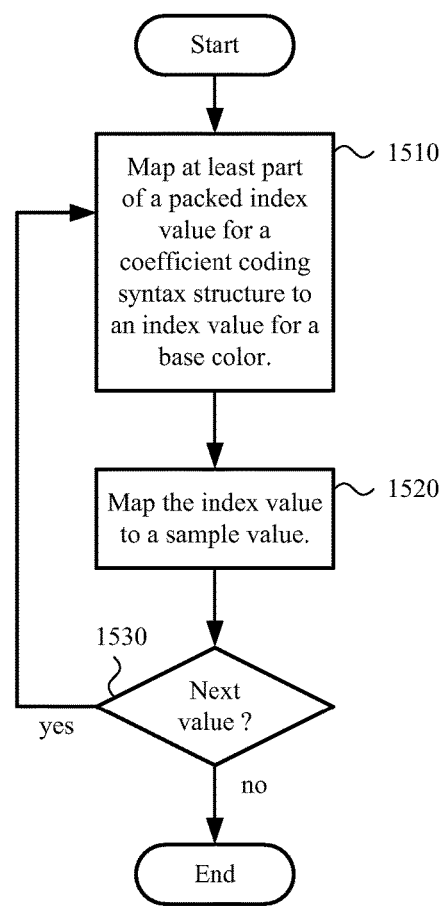

FIG. 15 illustrates a technique (1500) for mapping of index values for base colors during decoding. The technique (1500) can be performed by a decoder as described with reference to FIG. 4 or FIG. 6, or by another decoder.

The decoder maps (1510) at least part of a packed index value for a coefficient coding syntax structure to an index value for a base color.

For example, the decoder sets the index value based on the packed index value, e.g., as in the first mapping approach described above. Or, as another example, if the packed index value has a given relation to zero, the decoder sets the index value based on the packed index value times two, but otherwise the decoder sets the index value based on the packed index value times two minus one (e.g., as in the second mapping approach described above). Or, as another example, the decoder sets the index value using part of the packed index value, e.g., as in the third mapping approach described above, where a luma index value and multiple chroma index values are set based on the packed index value.

The decoder maps (1520) the index value to a sample value. For example, the decoder uses a base color table as described above to map a luma or chroma index value to a sample value.

Before the mapping operations, the decoder can predict a given packed index value then combined a packed index residual value with the predicted packed index value to reconstruct the packed index value. Or, the index values that are reconstructed can be index residual values.

The decoder checks (1530) whether to continue with the next index value. If so, the decoder maps (1510) at least part of a packed index value for the coefficient coding syntax structure to the next index value for a base color. The decoder can proceed in a raster scan pattern through the index values for a block. Or, for the third approach, the decoder can map a packed index value to multiple index values for corresponding positions in a luma block and chroma blocks, then map those index values to sample values.

D. Prediction of Elements of Index Map.

An encoder and decoder can also use prediction of elements of an index map. When prediction works well, many of the index residual values (or packed index residual values) have a value of zero. The prediction improves coding efficiency in typical entropy coding schemes because values closer to zero are encoded using fewer bits.

FIG. 16 shows a block (1610) of index values n with dimensions i, j, for $0 \le i \le 7$ and $0 \le j \le 7$. Alternatively, the prediction is applied to a block of another size (e.g., 4×4, 16×16 or 32×32). During encoding, the encoder predicts a given index value n(i,j) from one or more neighboring index values, on an index value-by-index value basis. The direction of prediction can be horizontal, vertical, diagonal in right-downward direction, or some other direction. In FIG. 16, for example, the direction of prediction is vertical, producing a block (1630) of index residual values $n_{resid}$. The index value n(i,j) is predicted using the preceding index value in the same column n(i,j−1). The index residual value is simply the difference between the two values. $n_{resid}(i,j)=n(i,j)-n(i,j-1)$. Similarly, for horizontal prediction, the index residual value is the difference between the index value and its left neighboring index value as the predicted index value: $n_{resid}(i,j)=n(i,j)-n(i-1,j)$. For diagonal prediction at a 45 degree downward angle, the index residual value can be calculated as $n_{resid}(i,j)=n(i,j)-(n(i,j-1)+n(i-1,j))\gg 1$, or it can be calculated as $n_{resid}(i,j)=n(i,j)-n(i-1,j-1)$. Prediction in other diagonal directions can similarly blend neighboring index values depending on the angle of prediction. For prediction at the edge of a block (e.g., i<0 and/or j<0), the neighboring index value can have a value of zero or be given a default value (e.g., number of index values divided by two). During decoding, the decoder determines the same predicted index value (depending on the direction of prediction) and combines the predicted index value with the index residual value. For vertical prediction, $n(i,j)=n_{resid}(i,j)+n(i,j-1)$. For horizontal prediction, $n(i,j)=n_{resid}(i,j)+n(i-1,j)$. For diagonal prediction at a 45 degree downward angle, $n(i,j)=n_{resid}(i,j)+(n(i,j-1)+n(i-1,j))\gg 1$, or $n(i,j)=n_{resid})+n(i-1,j-1)$. Prediction in other diagonal directions can similarly blend neighboring index values depending on the angle of prediction.

In FIG. 16, prediction is applied before index values are mapped to packed index values. Alternatively, prediction is applied after index values are mapped to packed index values.

Figure 17:
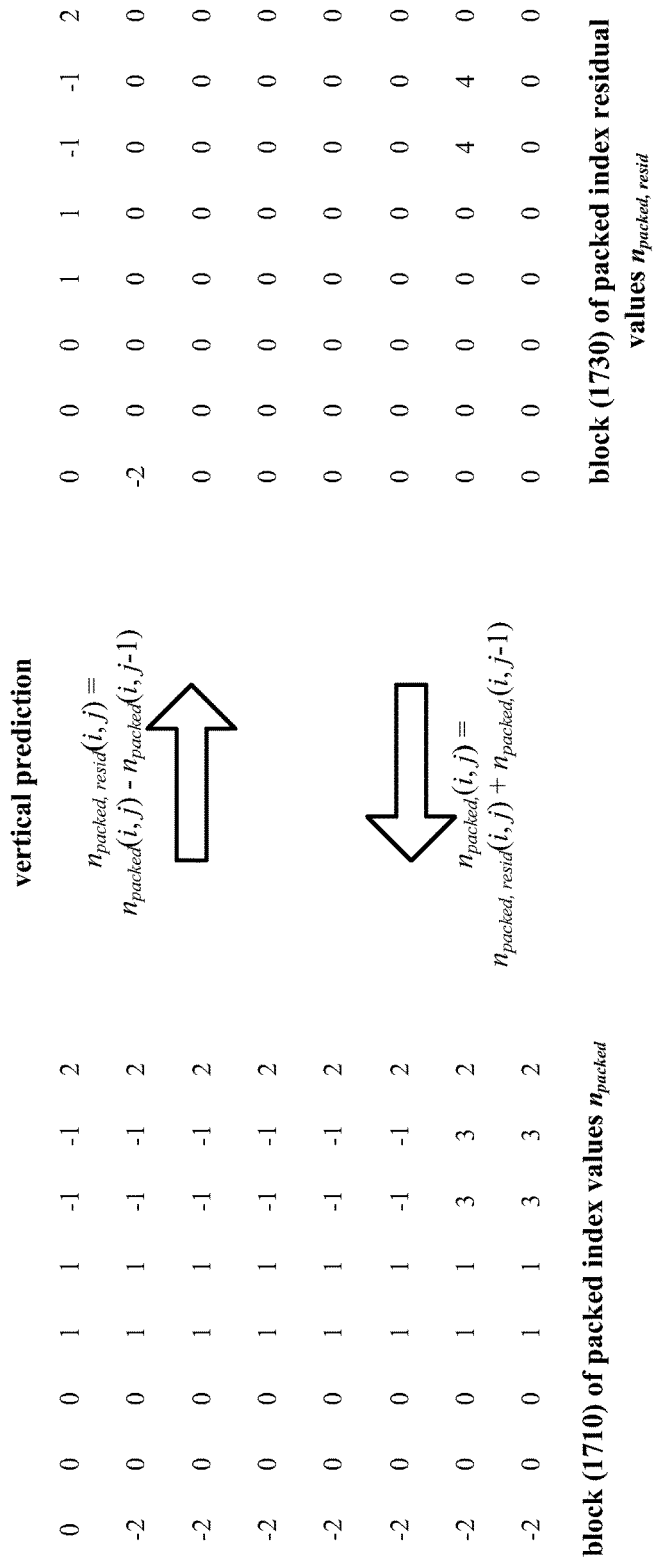

FIG. 17 shows a block (1710) of packed index values $n_{packed}$ with dimensions i, j, for $0 \le i \le 7$ and $0 \le j \le 7$. Alternatively, the prediction is applied to a block of another size (e.g., 4×4, 16×16 or 32×32). During encoding, the encoder predicts a given packed index value $n_{packed}(i,j)$ from one or more neighboring packed index values, on a packed index value-by-packed index value basis. The direction of prediction can be horizontal, vertical, diagonal in right-downward direction, or some other direction. In FIG. 17, for example, the direction of prediction is vertical, producing a block (1730) of packed index residual values $n_{packed, resid}$. The packed index value $n_{packed}(i,j)$ is predicted using the preceding packed index value in the same column $n_{packed}(i,j-1)$. The packed index residual value is simply the difference between the two values. $n_{packed, resid}(i,j)=n_{packed}(i,j)-n_{packed}$ (i,j−1). Similarly, for horizontal prediction, the packed index residual value is the difference between the packed index value and its left neighboring packed index value as the predicted index value: $n_{packed,\,resid}(i,j) = n_{packed}(i,j) - n_{packed}(i-1,j)$. For diagonal prediction at a 45 degree downward angle, the packed index residual value can be calculated as $n_{packed,\,resid}(i,j) = n_{packed}(i,j) - (n_{packed}(i,j-1) + n_{packed}(i-1,j)) >> 1$, or it can be calculated as $n_{packed,\,resid}(i,j) = n_{packed}(i,j) - n_{packed}(i-1,j-1)$. Prediction in other diagonal directions can similarly blend neighboring packed index values depending on the angle of prediction. For prediction at the edge of a block (e.g., i<0 and/or j<0), the neighboring packed index value can have a value of zero or be given a default value. During decoding, the decoder determines the same predicted packed index value (depending on the direction of prediction) and combines the predicted packed index value with the packed index residual value. For vertical prediction, $n_{packed}(i,j) = n_{packed,\,resid}(i,j) + n_{packed}(i,j-1)$. For horizontal prediction, $n_{packed}(i,j) = n_{packed,resid}(i,j) + n_{packed}(i-1,j)$. For diagonal prediction at a 45 degree downward angle, $n_{packed}(i,j) = n_{packed,resid}(i,j) + (n_{packed}(i,j-1) + n_{packed}(i-1,j)) >> 1$, or $n_{packed}(i,j) = n_{packed,resid}(i,j) + n_{packed}(i-1,j-1)$. Prediction in other diagonal directions can similarly blend neighboring packed index values depending on the angle of prediction.

In the preceding examples of prediction, subtraction operations are used during encoding, and addition operations are used during decoding. Alternatively, an encoder and decoder can use bitwise exclusive OR (XOR) operations in prediction.

When packed index values are predicted, the encoder determines a packed index residual value as a packed index value XOR its predicted packed index value. When index values are predicted, the encoder determines an index residual value as an index value XOR its predicted index value. The residual value is signaled to the decoder. The predicted value can depend on the direction of prediction (e.g., horizontal, vertical, diagonal).

When packed index values are predicted, the decoder determines a packed index value as its packed index residual value XOR the predicted packed index value. When index values are predicted, the decoder determines an index value as its index residual value XOR its predicted index value. Again, the predicted value can depend on the direction of prediction (e.g., horizontal, vertical, diagonal).

FIG. 18 illustrates prediction using XOR operations during encoding and decoding. The packed index value is 7, and the predicted packed index value (based on one or more neighboring packed index values) is 6. During encoding, the encoder determines the packed index residual is 1:00000001=00000111 XOR 00000110. During decoding, the decoder reconstructs the packed index value 7 from the packed index residual value and predicted packed index value: 00000111=00000001 XOR 00000110.

Instead of being applied to all bits of a value, predicted value and residual value, the prediction operations (whether subtraction, XOR or otherwise) can be applied to a subset of the bits. For example, the XOR operation can be applied to the lowest p bits of an index value and its predicted index value. Suppose $p_{mask}$ is $(1<<p)-1$. The encoder determines an index residual value $n_{resid}(i,j) = (n(i,j)>>p<<p) + (n_{predicted}(i,j)\ \&\ p_{mask})$ XOR $(n(i,j)\ \&\ p_{mask})$, where $n_{predicted}(i,j)$ can be $n(i,j-1)$, or $n(i-1,j)$ or some other predicted value depending on direction of prediction. The residual value is signaled to the decoder. The decoder determines the index value $n(i,j) = (n_{resid}(i,j)>>p<<p) + (n_{resid}(i,j)\ \&\ p_{mask})$ XOR $(n_{predicted}(i,j)\ \&\ p_{mask})$. The same operations can be applied to predicted packed index values. The operations on partial bits can be applied to least significant bits, most significant bits or middle bits of the values. The bits subjected to prediction operations can be continuous or not continuous.

In implementations that follow HEVC syntax, the encoder and decoder can reuse a coding tool that is normally used to predict residual values to instead predict elements of an index map. In particular, when no transform is applied to residual values (but quantization may or may not be applied), the encoder and decoder can use the tool to predict residual values from neighboring residual values. The coding tool and syntax for signaling its use can also be applied to elements of an index map.

FIG. 19 shows a technique (1900) for prediction of elements of an index map during encoding. The technique (1900) can be performed by an encoder as described with reference to FIG. 3 or FIGS. 5a and 5b, or by another encoder.

The encoder encodes (1910) data, in particular, encoding elements of an index map for a block using prediction. For example, when the index map includes index residual values, the encoder predicts an index value that represents a base color, then determines an index residual value based on the index value and the predicted index value. Or, when the index map includes packed index residual values, the encoder predicts a packed index value (where the packed index value is an index value that represents a base color and is packed into a coefficient coding syntax structure), then determines a packed index residual value based on the packed index value and the predicted packed index value. The encoding with prediction can include subtraction operations, XOR operations or other operations, on all bits of the values or on partial bits of the values.

The encoder outputs (1920) the encoded data. The encoder checks (1930) whether to continue with the next block. If so, the encoder continues by encoding (1910) elements of an index map for the next block.

FIG. 20 shows a technique (2000) for prediction of elements of an index map during decoding. The technique (2000) can be performed by a decoder as described with reference to FIG. 4 or FIG. 6, or by another decoder.

The decoder receives (2010) encoded data and decodes (2020) the encoded data. In particular, the decoder decodes elements of an index map for a block using prediction. For example, when the index map includes index residual values, the decoder predicts an index value that represents a base color, then combines an index residual value and the predicted index value. Or, when the index map includes the packed index residual values, the decoder predicts a packed index value (where the packed index value is an index value that represents a base color and is packed into a coefficient coding syntax structure), then combines a packed index residual value and the predicted packed index value. The decoding with prediction can include addition operations, XOR operations or other operations, on all bits of the values or on partial bits of the values.

The decoder checks (2030) whether to continue with the next block. If so, the decoder continues by receiving (2010) encoded data for the next block.

E. Handling of Exception Values.

When BCIM mode is used, in a base color table, an encoder and decoder can assign index values to every different sample value that is used in a block. In some cases, this can result in a base color table that is inefficient to signal, especially when some index values are used very infrequently. When a particular base color rarely appears in a block, it might not be worthwhile to assign an index value to that base color.

In some example implementations, an encoder and decoder can use any of several approaches to handle base colors that occur rarely in a block. An "exception" value with one of these rare base colors is not encoded or decoded using an index value.

In one approach, when an encoder identifies an exception value, the encoder determines the closest base color that is represented with an index value in the base color table. The encoder uses the index value for the closest base color to represent the exception value. A decoder reconstructs the exception value as the sample value associated with the index value in the base color table. This approach is a type of lossy compression and, in some cases, can lead to significant distortion.

In another approach, the encoder signals exception values directly as sample values, which may be quantized. For example, the encoder determines the highest packed index value h that is possible for a base color table, which depends on the approach used for mapping. When $n_{packed}=n$, the value h is the highest value of $n_{packed}$. When odd values of n are mapped according to $n_{packed}=(n+1)/2$, the value h is again the highest value of $n_{packed}$.

The encoder represents an exception value as $e=s/q+h+1$, where q is a quantization parameter, and / represents division with truncation towards zero. If no quantization is applied, q=1, and the division operation can be skipped. At the decoder side, if the packed index value $n_{packed}$ is less than or equal to h, the decoder decodes a sample value s from the packed index value $n_{packed}$ using mapping operations and a base color table, as described above. If the packed index value is greater than h, however, the packed index value is actually an exception value e, and the sample value is reconstructed as $s"=(e-h-1)*q$.

FIGS. 21a and 21b illustrate processing (2100) of exception values and index values for BCIM mode during encoding and decoding, respectively. In FIG. 21a, a block (2110) of sample values s includes some sample values that are represented with index values for base colors: 85, 41, 200, 168, 127, 26. These values are encoded in BCIM mode using the base color table shown in FIG. 21a.

The block (2110) also includes two sample values that occur infrequently in the block, and hence are not represented with index values for base colors. These two exception values—179 and 29—are encoded using a quantization parameter q (with q=4 in FIGS. 21a and 21b) and highest packed index value h (with h=3 in FIGS. 21a and 21b). The value of h depends on the range of index values. The value of q can change from block to block, slice to slice, tile to tile, picture to picture, etc. As shown in the block (2130) of packed index values and exception values e, the sample value 179 is encoded as the exception value 49=(181/4)+3+1, and the sample value 29 is encoded as the exception value 11=(29/4)+3+1.

As shown in FIG. 21b, during decoding, any packed index value greater than 3 is processed as an exception value. The exception value 49 is reconstructed as the sample value 180=(49−3−1)*4, and the exception value 11 is reconstructed as the sample value 28=(11−3−1)*4. Most values in the block (2150) are decoded in BCIM mode using mapping operations and the base color table shown in FIG. 21b.

Figure 22:
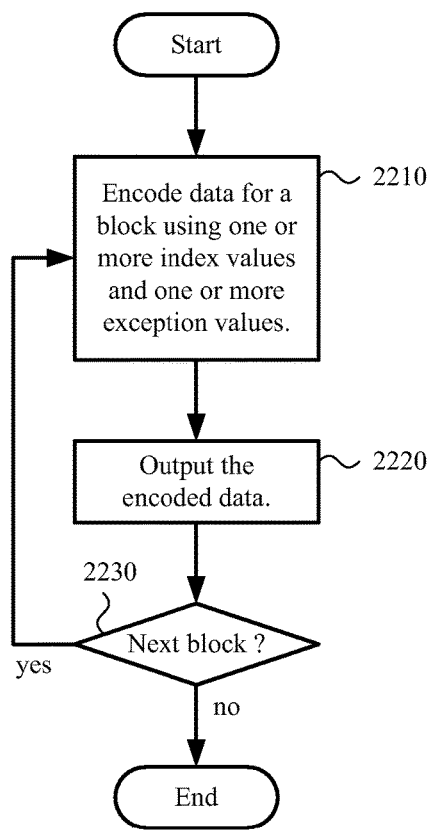
FIGS. 22 and 23 are flowcharts illustrating generalized techniques for encoding and decoding, respectively, using index values and exception values in a BCIM mode.

FIG. 22 shows a generalized technique (2200) for encoding using index values and exception values in a BCIM mode. The technique (2200) can be performed by an encoder as described with reference to FIG. 3 or FIGS. 5a and 5b, or by another encoder.

The encoder encodes (2210) data for a block using one or more index values each representing a base color and one or more exception values not representing any base color. For example, the encoder encodes some of the sample values of the block using packed index values or packed index residual values, as described above. The encoder also encodes some of the sample values as exception values. For example, the encoder replaces a sample value with an exception value using a quantization parameter and a highest packed index value.

The encoder outputs (2220) the encoded data. The encoder checks (2230) whether to continue with the next block. If so, the encoder continues by encoding (2210) data for the next block.

Figure 23:
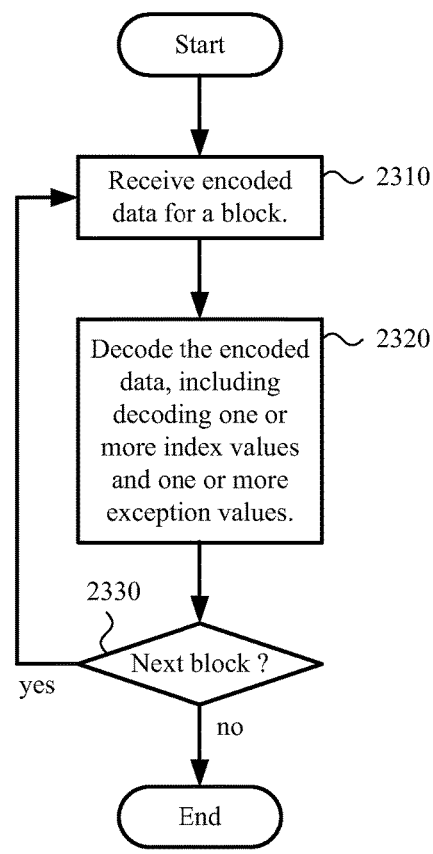

FIG. 23 shows a technique (2300) for decoding using index values and exception values in a BCIM mode. The technique (2300) can be performed by a decoder as described with reference to FIG. 4 or FIG. 6, or by another decoder.

The decoder receives (2310) encoded data and decodes (2320) the encoded data. In particular, the decoder decodes one or more index values each representing a base color. The one or more index values can be packed index values or packed index residual values. The decoder also decodes one or more exception values not representing any base color. For example, for one of the exception values, the decoder reconstructs a sample value using the exception value, a quantization parameter and a highest packed index value.

The decoder checks (2330) whether to continue with the next block. If so, the decoder continues by receiving (2310) encoded data for the next block.

Figure 24:
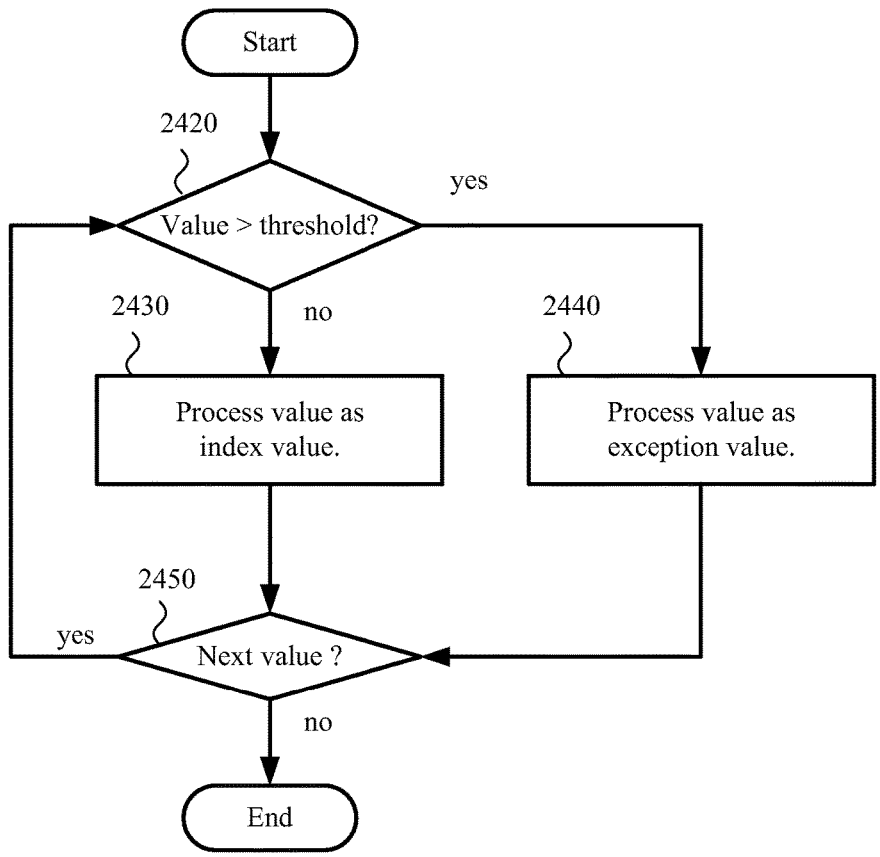
FIG. 24 is a flowchart illustrating an example technique for using index values and exception values in a BCIM mode.

FIG. 24 shows a more specific technique (2400) for using index values and exception values during decoding of a BCIM-mode block. The technique (2400) can be performed by a decoder as described with reference to FIG. 4 or FIG. 6, or by another decoder.

For a packed index value of the block, the decoder checks (2520) whether the value exceeds a threshold. For example, the threshold is the highest possible value for the packed index value. If the packed index value exceeds the threshold, the decoder processes (2540) the value as an exception value. Otherwise, the decoder processes (2530) the value using mapping operations and a base color table. The decoder then checks (2550) whether to continue with another value in the block. If so, the decoder checks (2520) how to decode the next value.

In the foregoing examples, the threshold is based on a highest packed index residual. Alternatively, when packed index residual values are used, the threshold is based on a highest possible packed index residual value, which depends on the greatest possible difference between a packed index value and its predicted packed index value.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A computing device comprising one or more processing units and memory, wherein the computing device implements an encoder of video or images, the encoder being configured to perform operations comprising:

encoding data for a coding unit of a picture using intra-picture compression, the coding unit including one or more blocks, wherein the encoding uses a base color table and an index map, the base color table assigning one or more index values to one or more corresponding base colors, the index map including at least one of the one or more index values, and the index map further including one or more exception values, the one or more exception values not representing any of the one or more corresponding base colors in the base color table, the one or more exception values being designated using a highest possible index value among the one or more index values of the base color table, and wherein the encoding includes:
setting a syntax element that indicates whether prediction mode for the coding unit is inter or intra, the syntax element indicating that the prediction mode for the coding unit is intra;
setting a flag value that indicates whether or not to use a base color index map mode, the flag value indicating to use the base color index map mode; and
entropy coding the syntax element and the flag value; and
outputting the encoded data, wherein the encoded data includes the syntax element and the flag value.

2. The computing device of claim 1 wherein the encoding further includes, for one of the one or more exception values:
encoding a sample value using a quantization parameter.

3. The computing device of claim 1 wherein the one or more index values are packed index values or packed index residual values.

4. The computing device of claim 1 wherein a given index value, among the one or more index values of the index map, is predicted using a neighboring index value that depends on whether prediction direction is horizontal or vertical.

5. The computing device of claim 4 wherein the prediction direction is horizontal and the neighboring index value is left of the given index value in the index map.

6. The computing device of claim 4 wherein the prediction direction is vertical and the neighboring index value is above the given index value in the index map.

7. The computing device of claim 1 wherein the base color table is created during the encoding the data for the coding unit.

8. In a computing device with a video decoder or image decoder, a method comprising:
receiving encoded data for a coding unit of a picture, the coding unit having been encoded using intra-picture compression, the coding unit including one or more blocks, wherein the encoded data includes a syntax element and a flag value, the syntax element indicating whether prediction mode for the coding unit is inter or intra, and the flag value indicating whether or not to use a base color index map mode; and
decoding the encoded data, wherein the decoding uses a base color table and an index map, the base color table assigning one or more index values to one or more corresponding base colors, the index map including at least one of the one or more index values, and the index map further including one or more exception values, the one or more exception values not representing any of the one or more corresponding base colors in the base color table, the one or more exception values being designated using a highest possible index value among the one or more index values of the base color table, and wherein the decoding includes:
entropy decoding the syntax element and the flag value;
determining, based on the syntax element, that the prediction mode for the coding unit is intra; and
determining, based on the flag value, to use the base color index map mode.

9. The method of claim 8 wherein the decoding further includes, for one of the one or more exception values:
reconstructing a sample value using a quantization parameter.

10. The method of claim 8 wherein the one or more index values are packed index values or packed index residual values.

11. The method of claim 8 wherein a given index value, among the one or more index values of the index map, is predicted using a neighboring index value that depends on whether prediction direction is horizontal or vertical.

12. The method of claim 11 wherein the prediction direction is horizontal and the neighboring index value is left of the given index value in the index map.

13. The method of claim 11 wherein the prediction direction is vertical and the neighboring index value is above the given index value in the index map.

14. The method of claim 8 wherein the base color table is decoded during the decoding the encoded data for the coding unit.

15. One or more computer-readable memory or storage devices storing computer-executable instructions for causing a computing device, when programmed thereby, to perform operations comprising:
receiving encoded data for a coding unit of a picture, the coding unit having been encoded using intra-picture compression, the coding unit including one or more blocks, wherein the encoded data includes a syntax element and a flag value, the syntax element indicating whether prediction mode for the coding unit is inter or intra, and the flag value indicating whether or not to use a base color index map mode; and
decoding the encoded data, wherein the decoding uses a base color table and an index map, the base color table assigning one or more index values to one or more corresponding base colors, the index map including at least one of the one or more index values, and the index map further including one or more exception values, the one or more exception values not representing any of the one or more corresponding base colors in the base color table, the one or more exception values being designated using a highest possible index value among the one or more index values of the base color table, and wherein the decoding includes:
entropy decoding the syntax element and the flag value;
determining, based on the syntax element, that the prediction mode for the coding unit is intra; and
determining, based on the flag value, to use the base color index map mode.

16. The one or more computer-readable memory or storage devices of claim 15 wherein the decoding further includes, for one of the one or more exception values:
reconstructing a sample value using a quantization parameter.

17. The one or more computer-readable memory or storage devices of claim 15 wherein a given index value, among the one or more index values of the index map, is predicted using a neighboring index value that depends on whether prediction direction is horizontal or vertical.

18. The one or more computer-readable memory or storage devices of claim 17 wherein the prediction direction is horizontal and the neighboring index value is left of the given index value in the index map.

19. The one or more computer-readable memory or storage devices of claim 17 wherein the prediction direction is vertical and the neighboring index value is above the given index value in the index map.

20. The one or more computer-readable memory or storage devices of claim 15 wherein the base color table is decoded during the decoding the encoded data for the coding unit.

* * * * *